United States Patent
Dividino et al.

(10) Patent No.: US 12,354,044 B2
(45) Date of Patent: *Jul. 8, 2025

(54) SYSTEM AND METHOD FOR VESSEL RISK ASSESSMENT

(71) Applicant: Global Spatial Technology Solutions Inc., Dartmouth (CA)

(72) Inventors: Renata Queiroz Dividino, St. Catharines (CA); Ana Luisa Alfaro Suzan, North York (CA); Dhivya Jayaraman, Halifax (CA); Benjamin Kurtis Friedrich, Halifax (CA); Robert Michael Marshy, Ottawa (CA)

(73) Assignee: Global Spatial Technology Solutions Inc., Dartmouth (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,386

(22) Filed: Oct. 20, 2023

(65) Prior Publication Data
US 2024/0046184 A1 Feb. 8, 2024

Related U.S. Application Data

(63) Continuation of application No. 17/171,516, filed on Feb. 9, 2021, now Pat. No. 11,836,648.

(51) Int. Cl.
*G06Q 10/00* (2023.01)
*G06N 3/00* (2023.01)
(Continued)

(52) U.S. Cl.
CPC ........... *G06Q 10/0635* (2013.01); *G06N 3/04* (2013.01); *G06N 3/08* (2013.01); *G06Q 10/083* (2013.01)

(58) Field of Classification Search
CPC .. G06Q 10/00–50/00; G06N 3/04; G06N 3/08
(Continued)

(56) References Cited

U.S. PATENT DOCUMENTS 9,779,594 B2 10/2017 Rigdon et al.
10,394,776 B2 8/2019 Khan
(Continued)

OTHER PUBLICATIONS

Salinas et al., "DeepAR: Probabilistic Forecasting with Autoregressive Recurrent Networks", Amazon Research, Germany, Cornell University, Feb. 22, 2019, pp. 1-12 <https://arxiv.org/abs/1704.04110>.

(Continued)

*Primary Examiner* — Mustafa Iqbal
(74) *Attorney, Agent, or Firm* — SMART & BIGGAR LP; Isis E. Caulder

(57) ABSTRACT

Provided are systems and methods for vessel risk assessment. This includes determining a risk assessment associated with a vessel, including receiving vessel data from at least one source, generating at least one vessel profile based on the vessel data, wherein each vessel profile provides indication of expected behavior events for one vessel and abnormal behavior events for one vessel, determining at least one abnormal behavior event of the vessel based on the at least one vessel profile, each event in the at least one abnormal behavior event having a time of occurrence, determining at least one frequency of occurrence of abnormal behavior events of the vessel based on the time of occurrence of each event, using at least one model to determine a risk assessment associated with the vessel based on the at least one frequency of occurrence of abnormal behavior events of the vessel.

28 Claims, 16 Drawing Sheets

(51) Int. Cl.
  *G06N 3/04* (2023.01)
  *G06N 3/08* (2023.01)
  *G06Q 10/0635* (2023.01)
  *G06Q 10/083* (2023.01)
(58) Field of Classification Search
  USPC .......................................................... 705/7.28
  See application file for complete search history.

(56) References Cited

U.S. PATENT DOCUMENTS

| | | | |
|---|---|---|---|
| 10,399,650 | B2 | 9/2019 | Delay et al. |
| 10,572,809 | B1 | 2/2020 | Schurmann |
| 11,342,051 | B1 | 5/2022 | Jain et al. |
| 2015/0371182 | A1 | 12/2015 | Lucas et al. |
| 2017/0043848 | A1* | 2/2017 | Rigdon .................. B63B 69/00 |
| 2020/0184828 | A1 | 6/2020 | Mazor et al. |
| 2020/0264268 | A1 | 8/2020 | Moore et al. |
| 2020/0264296 | A1* | 8/2020 | Dunagan .................. G08G 3/00 |
| 2021/0295708 | A1 | 9/2021 | Chung et al. |
| 2022/0293282 | A1 | 9/2022 | Lee et al. |
| 2022/0374797 | A1 | 11/2022 | Kalinski |

OTHER PUBLICATIONS

Wang, "Risk Assessment of the Overseas Imported COVID-19 of Ocean-Going Ships Based on AIS and Infection Data", ISPRS Int. J. Geo-Inf., May 27, 2020, 9(6), 351, pp. 1-14.

International Search Report and Written Opinion mailed May 10, 2022 in International Patent Application No. PCT/CA2022/050176 (7 pages).

Ding et al., "Incorporating Dynamic Flight Network in SEIR to Model Mobility between Populations", Appl Netw Sci, 2021, 6(1): 42 (pp. 1-24).

Chande et al., "Real-time, interactive website for US-county-level COVID-19 event risk assessment", Nat Hum Behav, 2020, 4: 1313-1319.

Bohning et al., "Estimating the undetected infections in the Covid-19 outbreak by harnessing capture-recapture methods", International Journal of Infectious Diseases, 2020, 97: 197-201.

Final Office Action mailed Nov. 14, 2022 in U.S. Appl. No. 17/171,516 (21 pages).

Advisory Action mailed Feb. 15, 2023 in U.S. Appl. No. 17/171,516 (5 pages).

Non-final Office Action mailed Mar. 20, 2023 in U.S. Appl. No. 17/171,516 (17 pages).

National Academies of Sciences, Engineering, and Medicine. 2003. Shipboard Automatic Identification System Displays: Meeting the Needs of Mariners—Special Report 273. Washington, DC: The National Academies Press. https://doi.org/10.17226/10708.

Clement Iphar, Aldo Napoli, Cyril Ray, Erwan Alincourt, David Brosset "Risk Analysis of falsified Automatic Identification System for the improvement of maritime traffic safety" 2016, Glasgow, United Kingdom. pp.606-613—ISBN 978-1-138-02997-2. hal-01421905.

"Automatic identification system", Wikipedia, Feb. 3, 2021, pp. 6-8 <https://en.wikipedia.org/w/index.php?title=Automatic_identification_system&oldid=1004657806> (14 pages).

* cited by examiner

SYSTEM AND METHOD FOR VESSEL RISK ASSESSMENT

CROSS REFERENCE TO RELATED APPLICATIONS

This application claims the benefit of U.S. patent application Ser. No. 17/171,516 filed on Feb. 9, 2021, which is incorporated by reference herein in its entirety.

FIELD

The described embodiments relate to determining vessel risk assessments, and specifically to analyzing vessel tracking data in order to determine the risk a vessel poses for involvement in criminal activities, risk of communicable disease outbreaks, risk of system failure, risk of cargo loss, risk of fire, risk of break up, risk of delays and re-routing of vessels.

BACKGROUND

Global shipping poses many risks, including national security risks, risks related to communicable diseases, supply chain disruptions, and variable costs (including loading/unloading costs and insurance costs). Coast guard and naval resources are limited because the regions they are responsible for monitoring and protecting are very large, and not every vessel can be inspected.

Shipping vessels are tracked using vessel tracking devices such as Automatic Identification Systems (AIS) that include vessel-based transceiver systems. Each vessel transmits data including unique identification, position, course, and speed, amongst other things. The vessel may receive and display this information on an electronic chart display and information system (ECDIS). Shore-based tracking can include AIS base stations, and vessel traffic services (VTS) that may be provided at a harbor or port which provide functionality similar to air traffic control systems for aircraft.

AIS transceivers have been mandatory since the International Maritime Organization's (IMO) International Convention for the Safety of Life at Sea (SOLAS) for international voyaging ships with 300 or more gross tonnage (GT), and all passenger ships regardless of size. AIS has been implemented first as a terrestrial-based system (T-AIS) and later as a satellite-based system (S-AIS).

AIS data may be used to track vessels. AIS itself however, does not provide risk information for a vessel. Additionally, AIS data does not provide risk protection for vessels which disable, spoof, or otherwise make malicious use of the transmitted data.

First, a vessel tracking transceiver may be shut off by vessel crew. This may be done intentionally in order to hide the vessel cargo in cases where its export is from a sanctioned country (for example, oil exports from Iran) or where the transport of the vessel cargo is forbidden (for example, nuclear material through the waters of a nuclear free nation), where the vessel is hijacked, or unintentionally as a result of operator error.

Second, a vessel tracking transceiver may have its unique identifier changed or spoofed in order to assign false vessel information. This allows for the vessel to masquerade as a friendly vessel and enter ports, harbors, or national waters where they are unwelcome.

There is a need therefore for port authorities, national governments, and shipping companies to be able to quickly and accurately assess vessel risk in order to identify vessels that may represent a threat to the port and to the country (e.g., illegal goods or disease importation), or that compromise the logistic chain (e.g., loss of cargo). The need for improved risk assessments may include risk based on different criteria such as risk of involvement in criminal activities, risk of disease outbreaks, risk of system failure, risk of fire, risk of break up, risk of delays and re-routing, etc.

For at least these reasons, there exists a need for an improved system and method for determining abnormal events of vessels, and determining vessel risk assessments.

SUMMARY

Risk assessments can be explored in different purposes/applications that can include: safety/health safety; inspection; insurance, including determinations of premiums; and logistics, including resource planning.

In a first aspect, there is provided a method for determining a risk assessment associated with a vessel, the method comprising: receiving, at a processor, vessel data from at least one source; generating, at the processor, at least one vessel profile based on the vessel data, wherein each vessel profile provides indication of expected behavior events for one vessel and abnormal behavior events for one vessel; determining, at the processor, at least one abnormal behavior event of the vessel based on the at least one vessel profile, each event in the at least one abnormal behavior event having a time of occurrence; determining, at the processor, at least one frequency of occurrence of abnormal behavior events of the vessel based on the time of occurrence of each event; using at least one model to determine a risk assessment associated with the vessel based on the at least one frequency of occurrence of abnormal behavior events of the vessel.

In one or more embodiments, the at least one source may include at least one selected from the group of a vessel incidents information source, a vessel information source, a vessel tracking data source, a regional boundaries source, and a crime-related activity source.

In one or more embodiments, the method may further comprise: determining, at the processor, enhanced vessel tracking data based on the vessel data; and tagging the enhanced vessel tracking data based on vessel identification.

In one or more embodiments, the determining the enhanced vessel tracking data may comprise merging the vessel data with region boundary data.

In one or more embodiments, the at least one vessel profile may comprise statistical information for a first vessel for a first geographical region and the determination of a first abnormal event of the first vessel for the first geographical region may be based on the statistical information.

In one or more embodiments, an alarm may be generated based on the determination of the first abnormal event.

In one or more embodiments, the at least one abnormal behavior event may be determined based on the at least one vessel profile and a behavior data of the vessel for at least one route segment in the first geographical region.

In one or more embodiments, the method may further comprise: determining a cluster of anomalies in the at least one anomaly.

In one or more embodiments, the determining the risk assessment may comprise performing outlier detection based on the at least one abnormal behavior event and the at least one frequency of abnormal behavior.

In one or more embodiments, the at least one model may be selected from the group of a Naïve Bayesian model, a linear regression model, a multiple class classifier, and a Neural Network.

In one or more embodiments, the Neural Network may be a Recurrent Neural Network.

In one or more embodiments, the at least one model may comprise two or more models; and the determining the risk assessment associated with the vessel may comprise: determining a candidate risk assessment for each of the two or more models; and performing an election of the candidate risk assessments from the two or more models used to determine the risk assessment.

In one or more embodiments, the at least one model is determined for a single vessel.

In one or more embodiments, the at least one vessel profile may include at least one selected from the group of a vessel MMSI profile, a vessel name profile, a vessel destination profile, a vessel visit duration profile, a vessel trip duration profile, a vessel movement profile, a vessel speed profile, a vessel tracking transmission profile, a vessel tracking position accordance profile, a vessel sea route profile, a vessel crew size profile, a vessel incident profile and a vessel rendezvous profile.

In one or more embodiments, the detected at least one anomaly may include at least one selected from the group of a speed anomaly, a location anomaly, a vessel tracking transmission anomaly, and a rendezvous anomaly.

In a second aspect, there is provided a system for determining a risk assessment associated with a vessel, the system comprising: a memory, the memory comprising: a model for determining a risk assessment; a processor, the processor configured to: receive vessel data from at least one source; generate at least one vessel profile based on the vessel data, wherein each vessel profile provides indication of expected behavior events and abnormal behavior events for one vessel; determine at least one abnormal behavior event of the vessel based on the at least one vessel profile, each event in the at least one abnormal behavior event having a time of occurrence; determine at least one frequency of occurrence of abnormal behavior events of the vessel based on the time of occurrence of each event; use at least one model to determine a risk assessment associated with the vessel based on the at least one frequency of occurrence of abnormal behavior events.

In one or more embodiments, the at least one source may include at least one selected from the group of a vessel incidents information source, a vessel information source, a vessel tracking data source, a regional boundaries source, and a crime-related activity source.

In one or more embodiments, the processor may be further configured to: determine enhanced vessel tracking data based on the vessel data; and tag the enhanced vessel tracking data based on vessel identification.

In one or more embodiments, the determining the enhanced vessel tracking data may comprise merging the vessel data with region boundary data.

In one or more embodiments, the at least one vessel profile may comprise statistical information for a first vessel for a first geographical region and the determination of a first abnormal event of the first vessel for the first geographical region may be based on the statistical information.

In one or more embodiments, an alarm may be generated based on the determination of the first abnormal event.

In one or more embodiments, the at least one abnormal behavior event may be determined based on the at least one vessel profile and a behavior data of the vessel for at least one route segment in the first geographical region.

In one or more embodiments, the processor may be further configured to: determine a cluster of anomalies in the at least one anomaly.

In one or more embodiments, the determining the risk assessment may comprise performing outlier detection based on the at least one abnormal behavior event and the at least one frequency of abnormal behavior.

In one or more embodiments, the at least one model may be selected from the group of a Naïve Bayesian model, a linear regression model, a multiple class classifier, and a Neural Network.

In one or more embodiments, the Neural Network may be a Recurrent Neural Network.

In one or more embodiments, the at least one model may comprise at least two models and the processor may be further configured to: perform an election of the candidate risk assessments from the two or more models to determine the risk assessment.

In one or more embodiments, the at least one model may be for a single vessel.

In one or more embodiments, the at least one vessel profile may include at least one selected from the group of a vessel MMSI profile, a vessel name profile, a vessel destination profile, a vessel visit duration profile, a vessel trip duration profile, a vessel movement profile, a vessel speed profile, a vessel tracking transmission profile, a vessel tracking position accordance profile, a vessel sea route profile, a vessel crew size profile, a vessel incident profile and a vessel rendezvous profile.

In one or more embodiments, the detected at least one anomaly may include at least one selected from the group of a speed anomaly, a location anomaly, a vessel tracking transmission anomaly, and a rendezvous anomaly.

In a third aspect, there is provided a method for determining at least one abnormal event for a vessel, the method comprising: receiving a historical dataset from a historical database, the historical dataset comprising time-series data; determining at least one segment of the historical dataset; determining a parameter value for each segment of the at least one segment of the historical dataset; determining a lower parameter limit value and an upper parameter limit value based on the parameter value of each of the at least one segment of the historical dataset; and determining a vessel profile comprising the lower parameter limit value and the upper parameter limit value; receiving candidate vessel data from the vessel comprising time-series data; determining at least one segment of the candidate vessel data; determining a candidate parameter value for each segment of the at least one segment of the candidate vessel data; determining at least one abnormal event by comparing the candidate parameter value for each segment of the at least one segment of the candidate vessel data to the vessel profile.

In one or more embodiments, the determining the lower parameter limit value and the upper parameter limit value may further comprise determining the lower parameter limit value and the upper parameter limit value based on at least one of a historical parameter value determined for a geographic region and a historical parameter value determined for a time-of-year.

In one or more embodiments, the method may further comprise: determining an interquartile range based on the parameter value of each of the at least one segment of the historical dataset; and wherein the vessel profile further comprises the interquartile range.

In one or more embodiments, the determining the interquartile range may further comprise determining the interquartile range based on at least one of a historical parameter value determined for a geographic region and a historical parameter value determined for a time-of-year.

In one or more embodiments, the historical dataset may comprise at least one selected from the group of: a vessel MMSI dataset, a vessel name dataset, a port visit dataset, a vessel trip history dataset, a vessel trip movement dataset, a vessel trip speed dataset, a vessel tracking transmission dataset, a vessel trip position accordance dataset, a vessel sea route dataset, a vessel crew size dataset, a vessel incident dataset, and a vessel rendezvous dataset.

In a fourth aspect, there is provided a system for determining at least one abnormal event for a vessel, the method comprising: a memory comprising a historical dataset from a historical database, the historical dataset comprising time-series data; a processor in communication with the memory, the processor configured to: determine at least one segment of the historical dataset; determine a parameter value for each segment of the at least one segment of the historical dataset; determine a lower parameter limit value and an upper parameter limit value based on the parameter value of the at least one segment of the historical dataset; and determine a vessel profile comprising the lower parameter limit value and the upper parameter limit value; receive candidate vessel data from the vessel comprising time-series data; determine at least one segment of the candidate vessel data; determine a candidate parameter value for each segment of the at least one segment of the candidate vessel data; determine at least one abnormal event by comparing the candidate parameter value for each segment of the at least one segment of the candidate vessel data to the vessel profile.

In one or more embodiments, the processor may be further configured to: determine the lower parameter limit value and the upper parameter limit value by determining the lower parameter limit value and the upper parameter limit value based on at least one of a historical parameter value determined for a geographic region and a historical parameter value determined for a time-of-year.

In one or more embodiments, the processor may be further configured to: determine an interquartile range based on the parameter value of the at least one segment of the historical dataset; and wherein the vessel profile may further comprise the interquartile range.

In one or more embodiments, the processor may be further configured to: determine the interquartile range further by determining the interquartile range based on at least one of a historical parameter value determined for a geographic region and a historical parameter value determined for a time-of-year.

In one or more embodiments, the historical dataset may comprise at least one selected from the group of: a vessel MMSI dataset, a vessel name dataset, a port visit dataset, a vessel trip history dataset, a vessel trip movement dataset, a vessel trip speed dataset, a vessel tracking transmission dataset, a vessel trip position accordance dataset, a vessel sea route dataset, a vessel crew size dataset, a vessel incident dataset, and a vessel rendezvous dataset.

In a fifth aspect, there is provided a method for determining at least one risk assessment model for a vessel, the method comprising: receiving a historical dataset from a historical database, the historical dataset comprising: vessel data, vessel incident data, vessel anomaly data, and vessel crime activity data; dividing the historical dataset into at least two datasets comprising a training dataset and a test dataset; determining at least one trained model based on the training dataset; evaluating the at least one trained model using the test dataset to determine at least one evaluated model; selecting the at least one risk assessment model for the vessel based upon the at least one evaluated model.

In one or more embodiments, the determining the at least one trained model may comprise: determining a plurality of vessel segments based on the historical dataset, wherein each vessel segment comprises a corresponding vessel data segment, a corresponding vessel incident data segment, a corresponding vessel anomaly segment, and a corresponding vessel crime segment; performing supervised model training using the plurality of vessel segments, wherein for each segment the vessel data segment and the vessel anomaly segment may be inputs, and the vessel incident data and the vessel crime data may be corresponding labels for the inputs.

In one or more embodiments, each of the at least one trained model may be selected from the group of a Naïve Bayesian model, a linear regression model, a multiple class classifier, and a Neural Network; each of the at least one evaluated model may be selected from the group of a Naïve Bayesian model, a linear regression model, a multiple class classifier, and a Neural Network; each of the at least one risk assessment model may be selected from the group of a Naïve Bayesian model, a linear regression model, a multiple class classifier, and a Neural Network.

In one or more embodiments, the Neural Network may be a Recurrent Neural Network.

In one or more embodiments, the method may further comprise: receiving a user feedback request from a user device, the user feedback request comprising a feedback value and a corresponding identifier; and wherein the determining the at least one trained model may be further based on the feedback value and the corresponding identifier.

In a sixth aspect, there is provided a system for determining a risk assessment model for a vessel, the method comprising: a memory, the memory comprising a historical database, the database comprising a historical dataset: vessel data, vessel incident data, vessel anomaly data, and vessel crime activity data; a processor in communication with the memory, the processor configured to: divide the historical dataset into at least two datasets comprising a training dataset and a test dataset; determine at least one trained model based on the training dataset; evaluate the at least one trained model using the test dataset to determine at least one evaluated model; and select the at least one risk assessment model for the vessel based upon the at least one evaluated model.

In one or more embodiments, the processor may be further configured to determine the at least one trained model by: determining a plurality of vessel segments based on the historical dataset, wherein each vessel segment may comprise a corresponding vessel data segment, a corresponding vessel incident data segment, a corresponding vessel anomaly segment, and a corresponding vessel crime segment; performing supervised model training using the plurality of vessel segments, wherein for each segment the vessel data segment and the vessel anomaly segment may be inputs, and the vessel incident data and the vessel crime data are corresponding labels for the inputs.

In one or more embodiments, each of the at least one trained model may be selected from the group of a Naïve Bayesian model, a linear regression model, a multiple class classifier, and a Neural Network; each of the at least one evaluated model may be selected from the group of a Naïve Bayesian model, a linear regression model, a multiple class classifier, and a Neural Network; each of the at least one risk assessment model may be selected from the group of a Naïve Bayesian model, a linear regression model, a multiple class classifier, and a Neural Network.

In one or more embodiments, the Neural Network may be a Recurrent Neural Network.

In one or more embodiments, the system may further comprise: a network device in communication with the processor; a user device in communication with the network device; wherein the processor may be further configured to: receive, at the network device, a user feedback request from the user device, the user feedback request comprising a feedback value and a corresponding identifier; and wherein the processor may be configured to determine the at least one trained model based on the feedback value and the corresponding identifier.

BRIEF DESCRIPTION OF THE DRAWINGS

A preferred embodiment will now be described in detail with reference to the drawings, in which.

DESCRIPTION OF EXEMPLARY EMBODIMENTS

Figure 1:
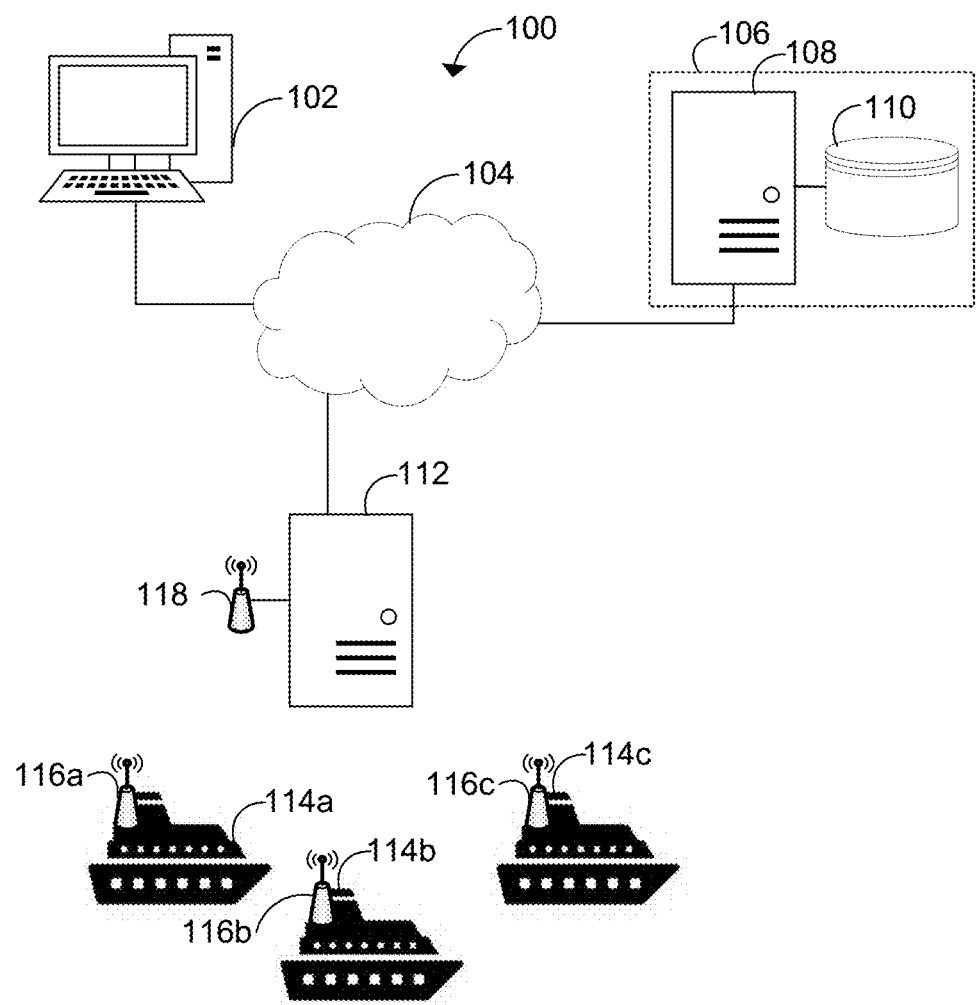
FIG. 1 shows a system diagram of a system for vessel risk assessment in accordance with one or more embodiments.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modifications and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

As recited herein, vessel tracking systems may include Automatic Identification Systems (AIS), and other such vessel tracking systems whether terrestrial-based or satellite-based.

As recited herein, abnormal behavior events and anomalies may be used interchangeably.

Reference is first made to FIG. 1, showing a system drawing 100 of a system for vessel risk assessment. The system 100 has a user device 102, a network 104, an assessment service 106 having a server 108 and a database 110, at least one vessel tracking provider server 112 having a vessel tracking transceiver 118, and at least one vessel 114 having a vessel tracking transceiver 116.

User devices 102 may be used by an end-user to access an application (not shown) running on assessment service 106. For example, the application may be a web application, or a client/server application. The user devices 102 may be a desktop computer, mobile device, or laptop computer. The user devices 102 may be in network communication with assessment service 106 via network 104. The user devices 102 may display the application, and may allow a user to request a vessel assessment of at least one of the vessels 114. The end user may be from a government agency such as the Coast Guard, a defense organization such as the Navy, a corporate organization such as an international shipping company, or another interested party.

Network 104 may be a communication network such as the Internet, a Wide-Area Network (WAN), a Local-Area Network (LAN), or another type of network. Network 104 may include a point-to-point connection, or another communications connection between two nodes.

Assessment service 106 includes one or more servers 108 and one or more databases 110. Assessment service 106 may provide software services to the user device 102 and may communicate with at least one vessel tracking provider server 112 to receive vessel tracking data. The assessment service 106 may further communicate with other data providers (not shown), including $3^{rd}$ party data providers for vessel incident information, vessel information, regional boundary information, and vessel crime information.

Assessment service 106 may provide a web application that is accessible by the user devices 102. The web application may provide user authentication functionality as known, so that a user may create an account and/or log into the web application in order to request or receive vessel assessments. The assessment service 106 may provide the vessel assessment functionality to a user as described herein.

Assessment service 106 may implement an Application Programming Interface (API) to receive requests from the user devices 102, or from a third party (not shown). The assessment service 106 may reply to the API requests with API responses, and the API responses may provide the functionality of the web application provided by assessment service 106. The API may receive requests and send responses in a variety of formats, such as JavaScript Object Notation (JSON) or eXtensible Markup Language (XML).

The assessment service API may receive requests from an application running on the user devices 102. The application running on the user devices 102 may be downloaded from the web application provided at assessment service 106, or may be downloaded from the Google® Play Store or the Apple® App Store.

Server 108 is connected to network 104 and database 110, and may provide functionality as described herein. The server may implement one or more external APIs, as described above. The server 108 may be a physical server, may be the same server device as the device running the database 110, or may be provided by a cloud provider such as Amazon® Web Services (AWS).

Server 108 may have a web server provided thereon for providing web-based access to the software application providing the API and/or the software application providing the web application. The web server may be one such as Apache®, Microsoft® IIS®, etc. The software application providing the API and the web application may be Apache® Tomcat, Ruby on Rails, or another web application framework as known.

The database 110 is connected to network 104 and may store historical data for a number of vessels, including regional boundaries (including data received from an external data source, and data determined or generated by the assessment service itself), vessel tracking data (for example, including AIS data received from an AIS data vendor), vessel data (including vessel data received by a vessel data vendor), vessel incident data (including vessel incident data from a vessel incident data vendor), and vessel crime data (including vessel crime data from a vessel crime data vendor or knowledgebase).

The database 110 may further store historical vessel information including historical vessel Maritime Mobile Service Identity (MMSI) information, historical vessel name information, historical vessel port visit information, historical vessel trip information, historical vessel visit information, historical vessel trip information, historical vessel trip movement information, historical vessel trip speed information, historical vessel tracking transmission information, historical vessel trip position accordance information, historical vessel trip sea route information, historical vessel trip crew size information, historical vessel incident information, and historical vessel rendezvous information. The database 110 may store other historical information such as historical vessel behavior tracking information, and historical vessel abnormal behavior information.

The database 110 may further store generated profiles determined by the assessment service. The generated profiles include statistical information for vessels, including statistical information such as vessel Maritime Mobile Service Identity (MMSI) profiles, vessel name profiles, vessel destination profiles, vessel visit duration profiles, vessel trip duration profiles, vessel movement profiles, vessel speed profiles, vessel tracking transmission profiles, vessel tracking position accordance profiles, vessel sea route profiles, vessel crew size profiles, vessel incident profiles, and vessel rendezvous profiles. The statistical information in the generated profiles may be determined for each vessel, for a type of vessel (including size, or manufacturer), or a combination of these factors. The database 110 may be a Structured Query Language (SQL) such as PostgreSQL or MySQL or a not only SQL (NoSQL) database such as MongoDB. For example, vessel profiles may include historical behavior change frequency distribution information as described herein.

Vessel tracking provider server 112 may be a first party server which is within the same organization as the assessment server 106, for example, a shore-based or satellite-based AIS receiver. Alternatively, the vessel tracking provider server 112 may be a third party provider, such as exactEarth®, ORBCOMM®, Spacequest®, or Spire®. The assessment service 106 may receive vessel tracking data from multiple different vessel tracking provider servers 112.

The vessel tracking provider server 112 may have a vessel tracking transceiver 118 that receives vessel tracking transmissions of the at least one vessel 114. The vessel tracking transmissions may include a plurality of data as described herein about each vessel and its location. The vessel tracking provider may provide an API for the assessment service 106 to request periodic vessel tracking transmission data to be transferred. The vessel tracking provider may alternatively push vessel tracking transmission data to an API at the assessment service 106.

The vessel tracking provider server 112 may provide vessel tracking data in a plurality of formats and standards. In an exemplary embodiment, the vessel tracking provider server 112 may provide AIS data according to the International Maritime Organization (IMO) International Convention for the Safety of Life at Sea (SOLAS) treaty. The vessel tracking provider server 112 may perform pre-processing of vessel tracking data that is received by the vessel tracking transceiver 118.

As disclosed herein, vessel tracking data may allow ships and shore-based stations to view marine traffic in a geographical area. For example, the vessel tracking data may be displayed on a chartplotter. Alternatively, vessel tracking transceiver signals for a geographical area may be viewed via a computer using one of several computer applications such as ShipPlotter and Gnuais.

Vessel tracking transceiver 118 may demodulate the signal from a modified marine VHF radiotelephone tuned to the vessel tracking frequencies and convert into a digital format that the vessel tracking provider server 112 can read, store in memory, transmit over network 104, or display (not shown). The vessel tracking data received by vessel tracking transceiver 118 and vessel tracking provider server 112 may then be shared via network 104 using TCP or UDP protocols as are known.

The vessel tracking transceiver 118 may be limited to the collective range of the radio receivers used in the network as the vessel tracking provider system. In one embodiment, the vessel tracking provider system may have a network of shore-based vessel tracking transceivers to provide broader geographical coverage. In another embodiment, the vessel tracking provider system may have a network of satellite-based vessel tracking transceivers that may be used to receive vessel tracking transmissions from earth orbit.

Vessel tracking transceiver 118 may be a satellite receiver, or a dedicated VHF vessel tracking transceiver. The vessel tracking transceiver may receive AIS signals from local traffic for viewing on an AIS enabled chartplotter, or using an AIS compatible computer system. Port authorities or other shore-based facilities may be equipped with transceivers. Vessel tracking transceiver 118 may transmit in the Very High Frequency (VHF) range, with a transmission distance of about 10-20 nautical miles.

In the exemplary example of an AIS vessel tracking system, transceiver 118 may use the globally allocated Marine Band channels 87 and 88. AIS transceiver 118 may use the high side of the duplex from two VHF radio "channels" (87B) and (88B). For example, the AIS transceiver may use channel A 161.975 MHz (87B) and channel B 162.025 MHz (88B).

Vessel tracking transceiver 118 may provide information such as a vessel's identity, vessel type, vessel position, vessel course, vessel speed, vessel navigational status and other vessel safety-related information automatically to appropriately equipped shore stations, other ships and aircraft. Vessel tracking transceiver 118 may receive automatically such information from similarly fitted ships, may monitor and track ships; and may exchange data with shore-based facilities.

At least one vessel 114 may carry an AIS transceiver according to SOLAS regulation V/19—Carriage requirements for shipborne navigational systems and equipment. This regulation requires that AIS transceivers be fitted aboard all ships of 300 gross tonnage and upwards engaged on international voyages, cargo ships of 500 gross tonnage and upwards not engaged on international voyages and all passenger ships irrespective of size. The vessels 114 may be a variety of different types of vessels, including sailboats, shipping vessels, motorboats, yachts, passenger vessels, ferries, etc. There may be some vessels not required under SOLAS regulation who elect to fit AIS transceivers anyways.

Vessel tracking transceivers 116 aboard vessels 114 may function the same as vessel tracking transceiver 118, but may be designed for operation on a vessel (i.e. sizing, electrical power requirements, etc.). Further, each vessel 114 may transmit its location using its corresponding vessel tracking transceiver 116. This may allow vessels to provide their location to other vessels to ensure awareness and visibility of their vessel.

Figure 2:
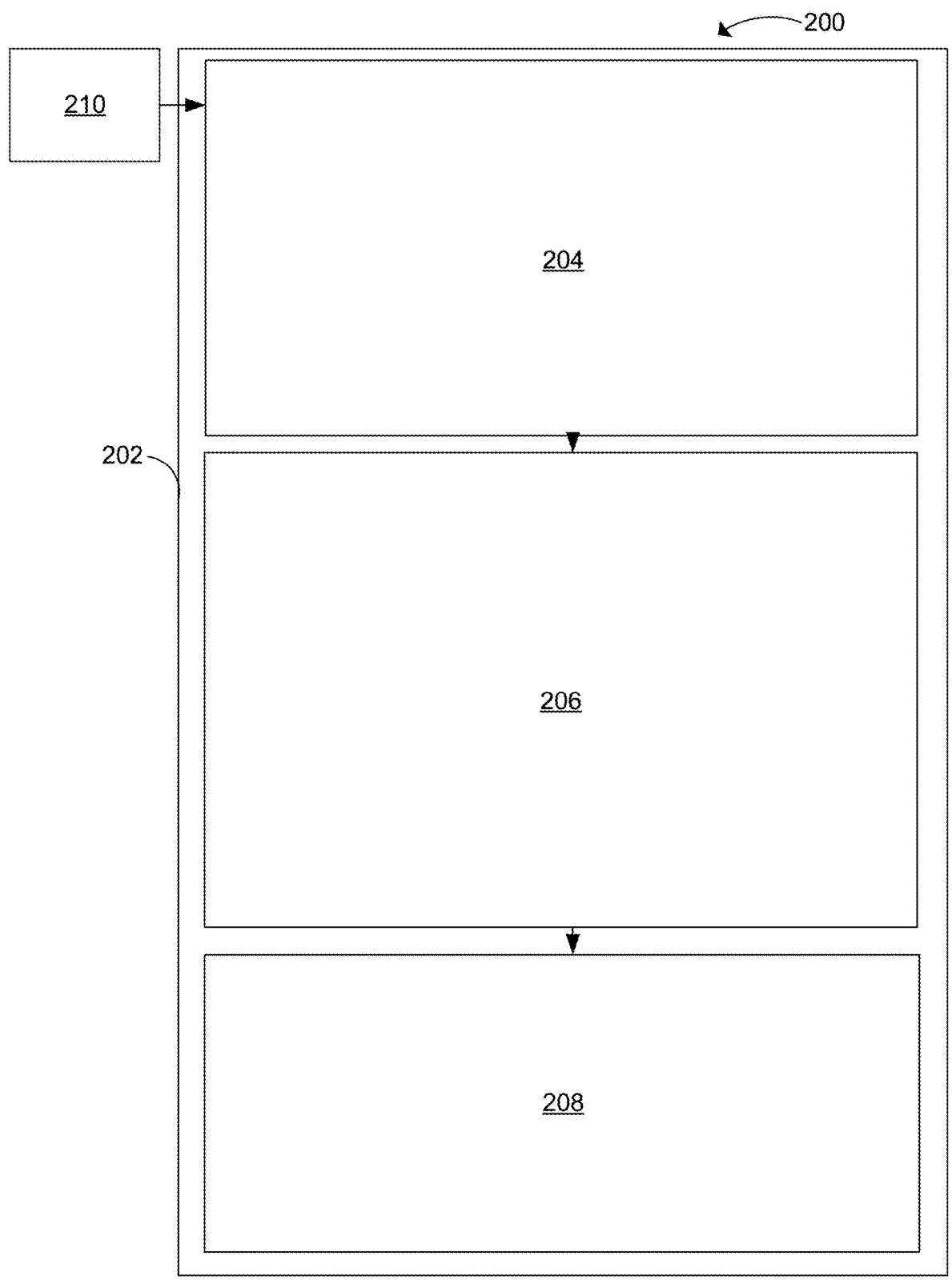
FIG. 2 shows a method diagram for determining a vessel risk assessment in accordance with one or more embodiments.

Referring next to FIG. 2, there is shown a method 200 for determining a vessel risk assessment in accordance with one or more embodiments. Method 200 may be a high-level method that is described in further detail herein. Method 200 may be performed by server 202, having data ingestion 204, vessel data processing 206, and vessel risk analysis 208.

One or more data sources 210 may be provided as input to the assessment server 202. These one or more data sources may include one or more vessel tracking data providers, one or more vessel information providers, one or more mapping providers, one or more regional boundary providers, one or more vessel incident providers, one or more crime-related activity providers, etc.

The data from the one or more data sources 210 is received by a data ingestion 204. The data ingestion process is described in further detail in FIG. 3. The ingested data is received by vessel data processing 206, which is described in further detail in FIGS. 4 and 5. The processed data is received by vessel risk analysis 208, which is described in more detail in FIGS. 6 and 7.

Figure 3:
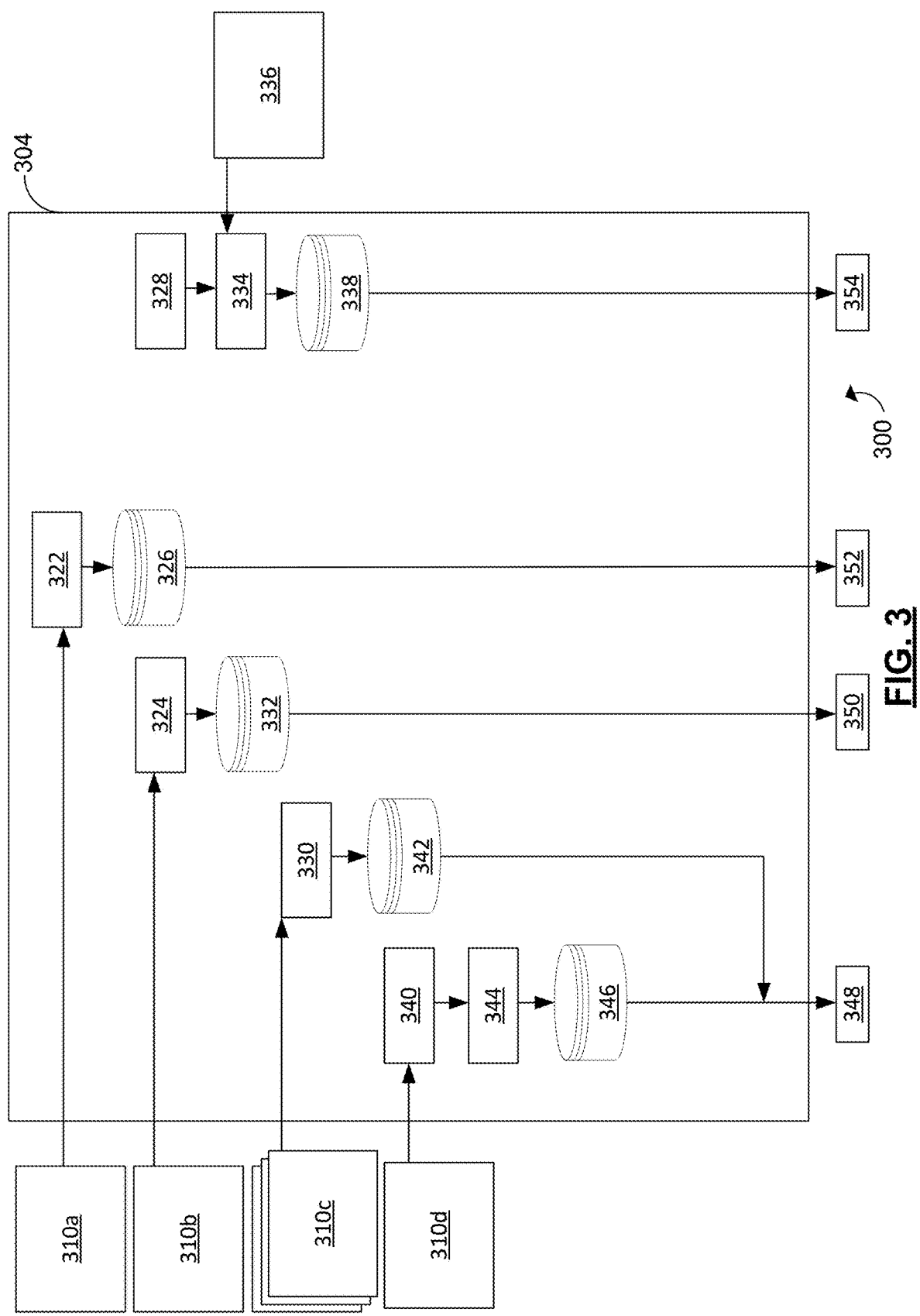
FIG. 3 shows a method diagram for ingesting data in accordance with one or more embodiments.

FIG. 3 shows a data ingestion method 300 provided by assessment server 304 in accordance with one or more embodiments. The data ingestion method may receive data from one or more data sources, including one or more vessel incident data providers 310a, one or more vessel information data providers 310b, one or more vessel tracking data providers 310c, one or more region boundary data providers 310d, and a vessel crime data provider 336. Data ingestion may occur periodically, i.e. daily, weekly, monthly, or may occur generally in real-time.

Data ingestion 300 may be performed to receive data into data lakes, and may use a data streaming service such as Amazon® Web Services (AWS®) Firehose Kinesis®. Data may be ingested in near real-time, or using a periodic polling process.

Vessel incident data is received from the one or more vessel incident data providers 310a at vessel incident data ingestion 322. The vessel incident data may be processed by vessel incident data ingestion 322, and may include pre-processing the incident data. The vessel incident data may include incidents of piracy, attempted piracy, collisions at sea between vessels, near misses at sea between vessels, destabilizing military equipment, dual use goods and narcotics-related transfers, untaxed or smuggled commodity transfers such as tobacco, oil and timber. Other activities that may be provided in the vessel incident data provided by the vessel incident provider 310a may include illegal, unreported and undocumented fishing as well as the movement of undocumented migrants in vessels that constitute a safety risk to their passengers. For example, the vessel incident data may be the Vessel and Maritime Incident Database from the Stockholm International Peace Research Initiative, the Transportation Safety Board of Canada Marine transportation safety investigations and reports database, the International Maritime Organization Maritime Facts and Figures Database, Confidential Human Factors Incident Reporting Program/Confidential Hazardous Incident Reporting Program (CHIRP) Reference Library Database, or another similar database.

The vessel incident data records provided by the vessel incident data providers 310a may also include geographical location information about each incident, timestamps and/or the duration of the incidents, vessel information from the incidents, etc. The vessel incident records, may include for example, Maritime Ship Security Advisories (for example, SHIP SECURITY ADVISORY NO. 12-20 from the Maritime Administrator of the Republic of the Marshall Islands, warning of piracy in the Gulf of Guinea).

Once the vessel incident data is ingested, it may be stored in a vessel incident database 326. The vessel incident database 326 may be stored at database 110 (see FIG. 1). The vessel incident database 326 may provide vessel incident data 352 to the vessel data processor and the risk analysis engine.

Vessel information data is received from the one or more vessel information data providers 310b at vessel data ingestion 324. The vessel information data providers may be a database such as the National Maritime Information Database (NMID) from the Canadian Government, the Information Handling Services (IHS) vessel database, the Spectrum Direct Database provided by Industry Canada/ITU. The vessel information data may include vessel name information, vessel crew information (including but not limited to, changes in vessel crew manifests, crew member nationality, etc.), vessel general classification information, vessel individual classification information (including classification history), a vessel station group MMSI, a vessel gross tonnage, vessel passenger capacity information, vessel length, vessel MMSI number, vessel registration information including applicant information of the vessel registration, vessel ownership information (for example, the corporation of legal entity e.g. Groenewald & Germishuys C C, Tangming Co Ltd), etc. The vessel information data, once processed by vessel data ingestion 324, may be stored in vessel database 332. The vessel database 332 may be stored at database 110 (see FIG. 1). The vessel database 332 may provide vessel data 350 to the vessel data processor and the risk analysis engine.

Vessel tracking data is received from the one or more vessel tracking data providers 310c for vessel tracking data ingestion 330. This may include satellite-based or terrestrial based tracking data.

In an exemplary embodiment, AIS data is received from the one or more AIS data providers 310c at AIS data ingestion 330. As described above, the AIS data may include Satellite AIS data (SAIS) and Terrestrial AIS data (TAIS). The AIS data may be stored as point data, corresponding to the periodic transmissions of an AIS equipped vessel.

Vessel tracking data may be processed by vessel tracking data ingestion 330, and may be decoded from a raw format. The processed vessel tracking data may be stored in the AIS database 342.

In an exemplary embodiment, AIS data may be processed by AIS data ingestion 330 and may be decoded from the AIS National Marine Electronics Association (NMEA) 0183 or NMEA 2000 data formats. The decoding may further include decoding AIS sentences such as AIVDM sentences. Decoding of AIS messages may further include decoding based on ITU Recommendation M.1371 (including revisions), IALA Technical Clarifications on Recommendation ITU-R M.1371-1, and IEC-PAS 61162-100. An AIVDM sentence may describe the vessel position and vessel information of a vessel, or other pieces of information as described in the AIS specifications. The processed AIS data may be stored in the AIS database 342.

The vessel tracking data ingestion 330 may determine variables from each vessel tracking data point or segment of vessel tracking data for a vessel.

The vessel tracking data ingestion 330 may further match vessels identified in the vessel tracking data with vessels found in the vessel database 332 or vessel incident database 326.

The vessel tracking database 342 may be stored at database 110 (see FIG. 1). The vessel tracking data from vessel tracking database 342 may be provided with the region boundary data from region boundary database 346 as vessel tracking data and boundary data 348 to the vessel processing and the risk analysis engine.

Regional boundary data is received from the one or more region boundary data providers 310d at region boundary data ingestion 340. The region boundary ingestion 340 may involve pre-processing of the region boundary data. Region boundary data curation 344 may be performed automatically, or manually, in order to connect disparate region boundaries in the region boundary data. The region boundary data may include a plurality of connected points, where each point has latitude and longitude data. The points may further be connected using the geometric location of ports, marine regions, and locations of Exclusive Economic Zones (EEZ). The region boundaries may be encoded in a shapefile. A shapefile may be a simple, nontopological format for storing the geometric location and attribute information of geographic features. Geographic features in a shapefile may be represented by points, lines, or polygons (areas).

Marine regions and EEZs may be provided as shapefiles. The marine region and EEZ shapefiles may be, for example, those produced by Flander Marine Institute which maintains a database of international borders in open waters. At 344, the shapefiles may be altered or curated. For example, an EEZ may be altered further to improve data processing times by reducing the size of the shapefile. The curation 344 may be performed by generating a one-way buffer in land for the EEZ. This may simplify the geometry around the coastline and allow joining of vessel tracking messages that may be at the land-sea boundary. The buffering of only 1 side may prevent an increasing of the extent of a countries EEZ.

The port shapefiles may be determined using the World Port Index ports. The ports may be converted into points, and then buffered to generate port zone shapefiles.

After the regional boundary data curation 344 is complete, the curated regional boundary data may be stored in region boundary database 346. The region boundary database 346 may be provided by database 110 (see FIG. 1). The region boundary database 346 may provide the curated region boundary data 348 to the vessel data processor and the risk analysis engine.

Vessel crime data is received from the one or more vessel crime data providers 336 at crime data ingestion 334. The vessel crime data may be provided from the one or more vessel crime data providers, or may be provided from a web extractor 328, such as a web-scraping tool that is capable of generating vessel crime data from publicly accessible websites.

Vessel crime data may include records of criminal activities onboard vessels, including but not limited to, murder, assault, illegal, unreported and unregulated fishing (IUUF), trafficking in persons (TiP) and smuggling of migrants (SoM), opioids smuggling, weapon smuggling, crimes committed onboard passenger vessels, etc.

The vessel crime data may be stored in vessel crime activity database 338. The vessel crime activity database 338 may be provided by the database 110 (see FIG. 1). The vessel crime activity database 338 may provide vessel crime activity data 354 to the vessel data processor and the risk analysis engine.

Figure 4:
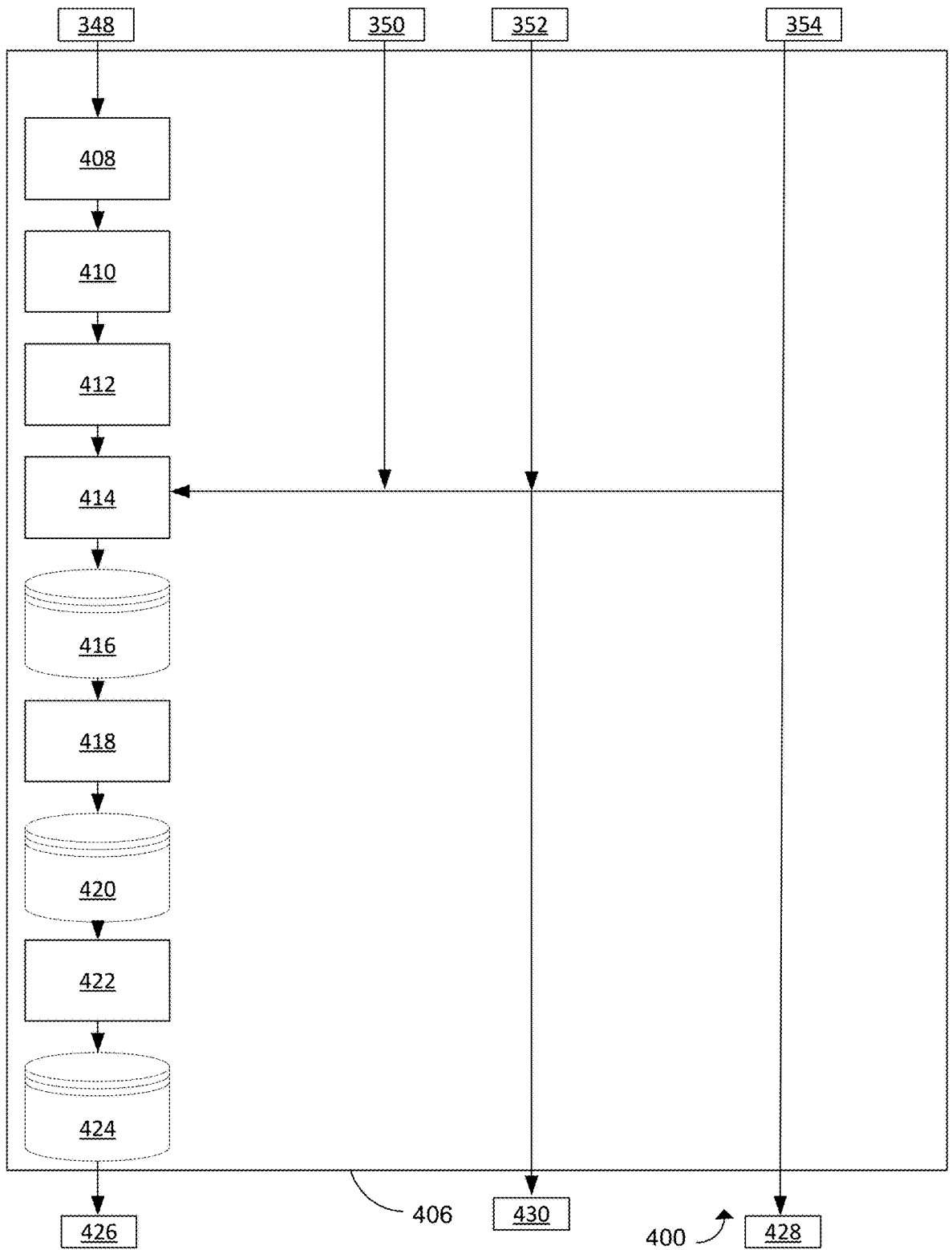
FIG. 4 shows a method diagram for processing vessel data in accordance with one or more embodiments.

Referring next to FIG. 4, there is shown a method 400 for processing vessel data in accordance with one or more embodiments. The method 400 may run at a vessel data processor 406, and may receive vessel tracking data and boundary data 348, vessel data 350, vessel incident data 352, and vessel crime activity data 354 from the data ingestion. Vessel incident data 352 may be provided at 430 to the risk analysis engine. Crime activity data 354 may be provided at 428 to the risk analysis engine.

Figure 15:
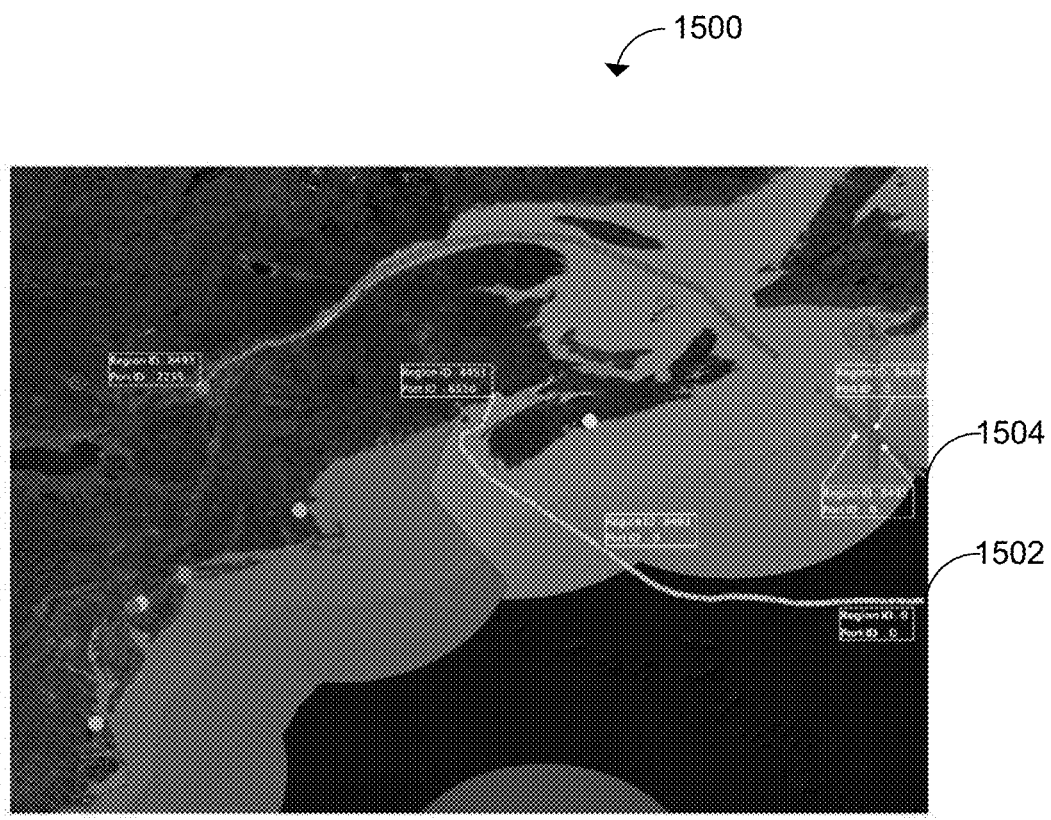
FIG. 15 shows a vessel tracking data enhancement diagram in accordance with one or more embodiments.

At 408, the vessel tracking data 346 is enhanced with boundary data 348. Step 408 may correspond to step 508, and may be described in more detail in FIG. 5, and the vessel tracking data enhancement is further described in more detail in FIG. 15. The join operator between the shapefiles and vessel tracking positions may output the corresponding location identification on which each vessel tracking message is being reported in. This information can then be used by later modules for selecting region specific analysis. FIG. 15 shows an example of the identified regions and ports.

The vessel tracking data may be enhanced in order to determine how often a vessel has been inside a particular economic zone, maritime zone, or port.

This may be performed using the following method.

First, a shapefile (nontopological format for storing geometric location and attribute information of geographic features) is received including geometric location of ports, marine regions, and Exclusive Economic Zones (EEZ). Geographic features in a shapefile can be represented by points, lines, or polygons (areas).

Next, a one-way buffer is determined inland for the EEZ. The buffer may simplify the geometry around the coastline as well as allowing joining of vessel tracking messages that may be on the land boundary.

Next, a plurality of port points from a plurality of port shapefiles are determined, and buffered.

Next, one or more position points are received and joined with the buffer.

At 410, one or more vessels may be identified in the vessel tracking data and boundary data. Step 410 may correspond to step 510, and may be described in more detail in FIG. 5. The vessels may be identified using an MMSI number, by detecting and matching a vessel name, or by another means of identification as is known. The identification may include assigning a unique vessel identifier to data points, creating a unique vessel identifier to assign to the data points, or updating an existing unique vessel identifier for the data.

At 412, a vessel behavior pattern classification may be performed. Step 412 may correspond to steps 523, 541 and 584, and may be described in more detail in FIG. 5. This may include determining a port visit by joining a vessel tracking data point or segment with a boundary. This enhancement may occur for many segments of a trip for a vessel, for each data point, or for particular portions of the data corresponding to a vessel. This may further include classifying data points based on a vessel movement classification. For example, each data point or segment may be classified as "moving", "port", "anchorage", "hop". The classification of the data points or segments may be used to identify the state of the vessel with respect to its movement. Further, each data point or trip may be classified based on a trip movement classification, including trip stop and go points. For example, stopped or moving. The trip movement classification may be for determining when and where the trip of the vessel starts and ends, including matching the start and the end with the region or port information. For example, the vessel has a very low speed and moves somewhat (approximately ~300 m) then it may be classified as 'at anchor'. Further, if the vessel moved very little (approximately less than ~50 m) then the vessel may be classified as 'berthed'.

In another example, a vessel segment may be classified as a 'hop' which includes small groupings of movement between stop points such as ports. These smaller trip segments ("hops") may be used to segment a vessel trajectory into smaller segments.

The vessel tracking data may be segmented, or grouped, into segments based on a time period, or in an exemplary embodiment the segments may be determined based on the vessel behavior pattern classification.

This segmentation may be based on time periods (for example, each segment may represent one hour of vessel tracking data for a particular vessel).

In an exemplary embodiment, segmentation may be based on movement classification as described herein, for example, a segment may be determined based on one trip point (such as a port) to another trip point (such as another port). Vessel movement classification is described further at 412. The vessel movement classification may further segment trips between ports into smaller segments as required, for example, for a fishing vessel which may take a particular zig-zag pattern while trawling at sea.

The vessel tracking data may be stored as raw vessel tracking data in vessel tracking database 342. The vessel tracking data may be grouped for each vessel into segments, or into individual trips (i.e. port to port). Optionally, each trip may be further segmented into time period segments as described above.

This may include (but is not limited to) determining distance travelled, speed, acceleration, jerk, bearing, and bearing rate.

The individual trip segments may be further augmented by extracting features from the data for each segment including one or more points, known as point features. The point features may include distance travelled, speed, acceleration, jerk, bearing, and bearing rate.

Further, at 412, statistical information about a data point, or a trip segment may be determined as disclosed herein. The statistical information may include average, mean, mode, minimum, maximum values for a data point or segment.

For a segment of vessel tracking data, statistics based on the vessel tracking data points may be determined including maximum, minimum, mean, median, standard deviation, and the 10th, 25th, 75th and 90th percentiles for the vessel tracking reported speed for each vessel and at different ocean regions. The statistics may also be determined for the distance travelled, acceleration, jerk, and bearing rate (or any other determined statistic) in addition to speed.

Steps 414, 416, 418, 420, 422 and 424 may correspond to an anomaly pipeline. More details of anomaly pipelines may be described in FIG. 5. The anomaly pipeline including steps 414, 416, 418, 420, 422, and 424 may include one or more of the anomaly pipelines described in FIG. 5.

At 414, changes in vessel behavior may be determined from the behavior classification in 412, or determined based on other data including vessel data 350, vessel incident data 352, and crime activity data 354. The changes in vessel behavior may be described in further detail in each of the pipelines described in FIG. 5. The changes in vessel behavior may be stored in vessel behavior history database 416. The vessel behavior history database 416 may be stored in database 110 (see FIG. 1). For each vessel, changes in behavior may be tracked over time in the vessel behavior history database 416.

The changes in vessel behaviour may augment individual trip segments as point features (as described in 408 above).

For a segment of vessel tracking data, statistics based on the changes in vessel behavior may be determined including maximum, minimum, mean, median, standard deviation, and the 10th, 25th, 75th and 90th percentiles for the vessel tracking reported speed for each vessel and at different ocean regions. The statistics may also be determined for the distance travelled, acceleration, jerk, and bearing rate (or any other determined statistic) in addition to speed.

At 418, a vessel profile including a vessel behavior change frequency distribution may be generated. This may include different frequency distributions for each of several different types of behavior changes, for example, trip movement changes.

At 420, the vessel profile including a vessel behavior change frequency distribution may be stored in the vessel profile database 420. The vessel profile database 420 may be provided at database 110 (See FIG. 1).

At 422, vessel behavior change outlier detection may be performed in order to determine or detect outlier values in the vessel behavior change history, including abnormal behavior event and anomalies. The outlier detection 422 may store abnormal events identified by the outlier detection in vessel behavior abnormal behavior history database 424.

The vessel behavior abnormal behavior history database 424 may record abnormal events detected using outlier detection. The abnormal behavior history may include outliers detected based upon a change in the frequency of abnormal events detected from the vessel tracking. The vessel behavior abnormal behavior history database 424 may be provided by database 110 (see FIG. 1). The vessel behavior abnormal behavior history database 424 may provide abnormal behavior history data 426 to the vessel risk analysis engine.

Figure 5:
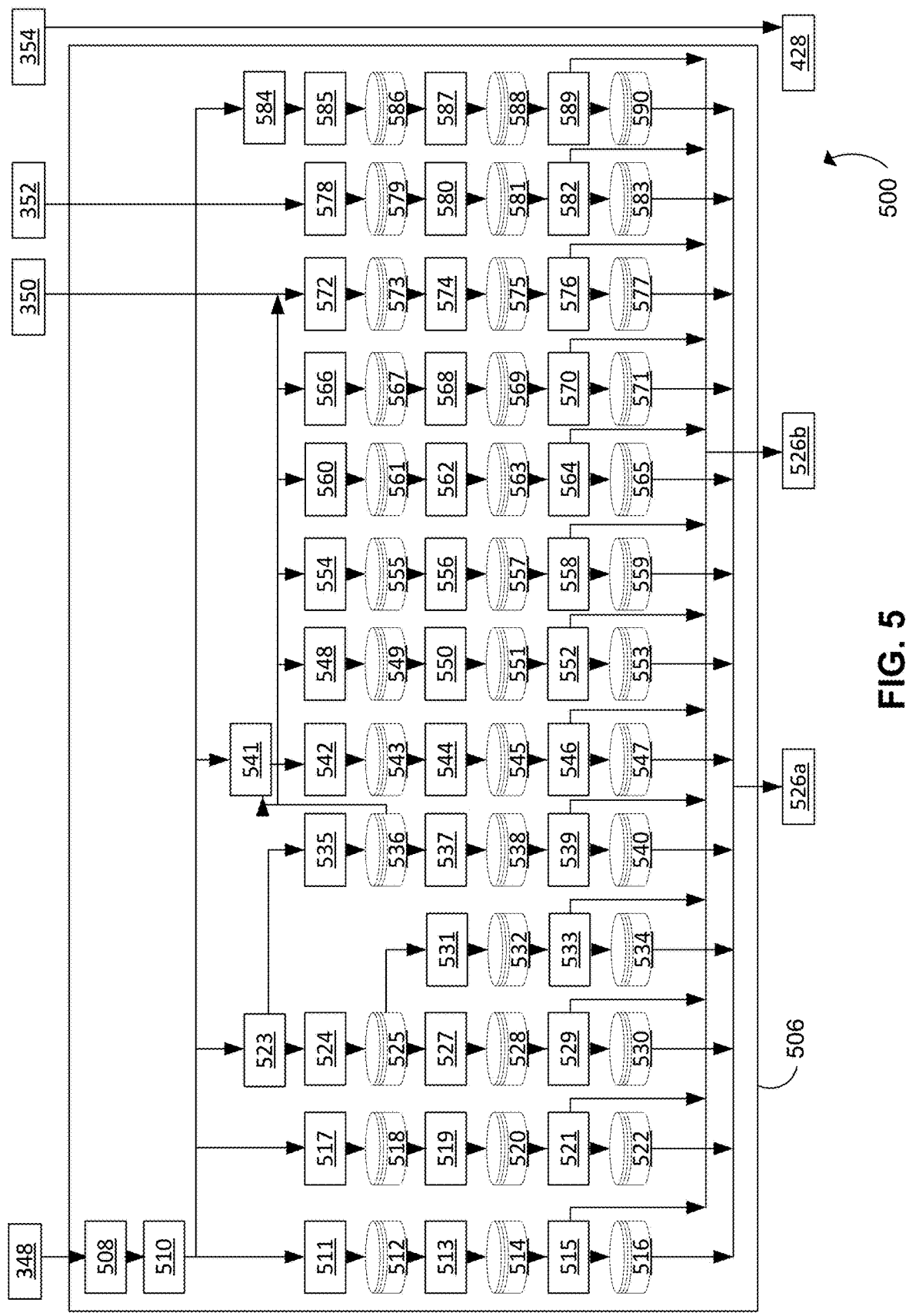
FIG. 5 shows an alternate method diagram for processing vessel data in accordance with one or more embodiments.

Referring next to FIG. 5, there is shown an alternate method 500 for processing vessel data in accordance with one or more embodiments.

The method 500 may run at a vessel data processor 506, and may receive vessel tracking data and boundary data 348, vessel data 350, and vessel incident data 352, and vessel crime activity data 354 from the data ingestion (in this embodiment, vessel crime activity data 354 may be passed through to the risk analysis engine at 428). Vessel incident data 352 may be provided at 430 to the risk analysis engine. Crime activity data 354 may be provided at 428 to the risk analysis engine.

The method 500 may run as the vessel data processor 506 receives data in real-time, including identifying anomaly events. In this manner, the determination of vessel profiles may be performed independently of the real-time data processing as vessel data is received.

In an alternate embodiment, the vessel data processor 506 may run in order to process a set of historical data and to prepare a plurality of vessel profiles.

In another alternate embodiment, as real-time data is received at the vessel data processor 506, the real-time anomaly detection is performed, and the vessel profiles are updated at the same time.

At 508, the vessel tracking data and boundary data 348 is enhanced. The vessel tracking data enhancement is discussed in more detail in FIG. 15. This enhancement may occur for each data point, or for particular portions of the data corresponding to a vessel. The join operator between the shapefiles and vessel tracking positions may output the corresponding location identification on which each vessel tracking message is being reported in. This information can then be used by later modules for selecting region specific analysis. The data enhancement including the location identification may identify whether a particular vessel tracking data point or segment is within a particular boundary defined by the boundary data.

The vessel tracking data may be enhanced in order to determine how often a vessel has been inside a particular economic zone, maritime zone, or port.

This may be performed using the following method.

First, a shapefile (nontopological format for storing geometric location and attribute information of geographic features) is received including geometric location of ports, marine regions, and Exclusive Economic Zones (EEZ). Geographic features in a shapefile can be represented by points, lines, or polygons (areas).

Next, a one-way buffer is determined inland for the EEZ. The buffer may simplify the geometry around the coastline as well as allowing joining of vessel tracking messages that may be on the land boundary.

Next, a plurality of port points from a plurality of port shapefiles are determined, and buffered.

Next, one or more position points are received and joined with the buffer.

At 510, one or more vessels may be identified in the vessel tracking data and boundary data. The vessels may be identified by determining a unique vessel signature, and assigning a corresponding unique vessel identifier based on the unique vessel signature. The unique vessel identifier may be an internal identifier of the vessel assessment system, and each segment may have a unique vessel identifier associated with it. Alternatively, an MMSI number may be determined, or a vessel name may be detected or matched, or by another means of identification as is known. The identification may include assigning a unique vessel identifier to data points or segments, creating a unique vessel identifier to assign to the data points or segments, or updating an existing unique vessel identifier for the data points of segments.

The method 500 describes a plurality of anomalies that may be determined from the data at the vessel data processor 506. This may be performed by transforming the vessel tracking data and boundary data 348, vessel data 350, and vessel incident data 352 to identify a parameter value for each point or segment of the vessel tracking and boundary data provided at 510. A vessel profile corresponding to the parameter may be provided (in the case where it is pre-generated) or generated. An anomaly, (also referred to herein as an abnormal behavior event) may be determined using the data at the vessel data processor 506 and the vessel profiles. The determined abnormal events for each parameter may have a frequency of occurrence for the trip, or the segment which may be determined. Other statistical operations besides determining the frequency may be used, including find an average count, a minimum count, a maximum count of the occurrences of the abnormal event. Other statistical operations may be used as known. The determined frequencies of occurrence may be used in order to determine abnormal events in the segments, and a history of the abnormal events may be stored for each vessel. Examples of a variety of different abnormal event determination methods will now be described as part of the vessel data processor.

Vessel MMSI Anomalies

The vessel MMSI anomaly pipeline is described in FIG. 5, and includes steps 511, 512, 513, 514, 515 and 516.

A Maritime Mobile Service Identity (MMSI) may be an identifier such as a series of nine digits which are sent in digital form over a radio frequency channel in order to identify ship stations, ship earth stations, coast stations, coast earth stations, and group calls. These identities may be formed in such a way that the identity or part thereof can be used by telephone and telex subscribers connected to the general telecommunications network to call ships automatically.

The MMSIs may be provided by a national organization. For example, in the United States, the National Telecommunications Administration (NTIA) provides MMSIs to federal users, and the Federal Communication Commission (FCC) provides MMSIs to everyone else. In Canada, Innovation, Science and Economic Development Canada (ISED) may provide MMSIs.

As part of a vessel tracking transmission, a vessel may include an MMSI identifier. The MMSI identifier for a vessel tracking transceiver may change, for example if the vessel tracking transceiver or vessel is sold. Alternatively, an MMSI identifier may be changed by a nefarious vessel operator in order to hide illegal or risky activities.

As described above, at 510 a unique vessel identifier based on the unique vessel signature may be assigned to a vessel.

At 511, a vessel tracking MMSI identifier may be identified for the one or more data points received from 510. The MMSI may be decoded from the vessel tracking data based on Recommendation M.585 "Assignment and use of identities in the maritime mobile service" published by the International Telecommunication Union (ITU). The MMSI change may be for legitimate reasons or the MMSI change may be to conceal the true identity of the vessel.

The decoding of MMSI may include determining a series of nine digits. The decoding of MMSI may include determining a ship station identity, a group ship station identity, a coast station identity, a group coast station identity, a Search and Rescue (SAR) aircraft, and navigational aids and craft associated with a parent ship.

The data points corresponding to each vessel identified by the unique vessel identifier determined at 510 may have an MMSI identifier identified in the data received from 510.

The decoded MMSI for each data point for a vessel may be stored in a MMSI history database 512, such that a vessel MMSI history is determined. The MMSI history database 512 may be provided by database 110 (see FIG. 1). The MMSI history in vessel history database 512 may be associated with the unique vessel identifier.

At 513, a vessel MMSI behavior profile may be generated based on the vessel MMSI history received from MMSI history database 512. The profile may be a statistical model, such as a distribution related to the changing of MMSI identifier. The profile may include statistics such as the maximum, minimum, mean, median, standard deviation, and the 10th, 25th, 75th and 90th percentiles for the MMSI changes for each vessel. The profile may further include an upper limit, lower limit, upper quartile and lower quartile related to the MMSI identifier. The vessel profile may include upper limit, lower limit, upper quartile and lower quartile related to changes of the MMSI identifier, for example, an upper limit threshold may be 2 changes of the MMSI identifier for a vessel and the lower limit threshold may be 0 changes of the MMSI identifier for a vessel. MMSI changes may occur often (e.g. seasonally) for some vessels in order to comply with shipping regulations. The MMSI behavior profile may capture the expected number of changes for a vessel. Using the profile, if a vessel MMSI is changing more or less often than expected, then that may be determined as a MMSI anomaly. The percentiles indicated above may help to define a "normal" range of MMSI changes per vessel.

For example, the vessel MMSI behavior profile may define an expected number of MMSI changes calculated using the equation:

$$\text{Expected MMSI changes} = [(2 * \text{Interquartile range (IQR)}^6) + 75th\text{Percentile}$$

The determined vessel MMSI behavior profile may be stored in vessel MMSI profile database 514. The vessel MMSI profile database 514 may be provided by database 110 (see FIG. 1). The MMSI behavior profile in vessel MMSI profile database 514 may be associated with the unique vessel identifier.

At 515, MMSI anomaly (or abnormal behavior event) detection may be performed. The MMSI anomaly detection may compare the MMSI history from MMSI history database 512 for a vessel against the determined vessel profile from vessel MMSI profile database 514. This may involve, for example, comparing one or more data points from a vessel to the lower MMSI change limit, the upper MMSI change limit. This may further involve determining whether the number of MMSI changes falls within a lower quartile and an upper quartile. Outlier detection may be used in order to identify anomaly events within the one or more segments of a vessel in the MMSI history.

The anomaly events may be identified and stored in MMSI anomaly detection history database 516. The MMSI anomaly detection history database 516 may be provided by database 110 (see FIG. 1). The MMSI anomaly history in MMSI anomaly detection history database 516 may be associated with the unique vessel identifier.

Vessel Name Anomalies

The vessel name anomaly pipeline is described in FIG. 5, and includes steps 517, 518, 519, 520, 521 and 522.

Vessel names may be changed by a vessel operator. The name change may be for legitimate reasons or the name change may to conceal the true identity of the vessel. Vessel tracking transmissions may include the vessel name.

As described above, at 510 a unique vessel identifier based on the unique vessel signature may be assigned to a vessel.

At 517, a vessel name may be identified or decoded from the one or more data points received from 510. The vessel name may be decoded from the vessel tracking data in the one or more segments.

The identified vessel name from the one or more data points may be stored in a vessel name history database 518. The vessel name history database may be provided by database 110 (see FIG. 1). The vessel name history in vessel name history database 518 may be associated with the unique vessel identifier.

At 519, a vessel name behavior profile may be generated based on the vessel name history received from vessel name history database 518. The profile may be a statistical model, such as a distribution related to the changing of vessel name. The profile may further include an upper limit, lower limit, upper quartile and lower quartile related to the vessel name. The profile may include statistics such as the maximum, minimum, mean, median, standard deviation, and the 10th, 25th, 75th and 90th percentiles for the vessel name changes for each vessel and at different ocean regions. The vessel profile may include upper limit, lower limit, upper quartile and lower quartile related to changes to the vessel name, for example, a upper limit threshold may be 2 changes of the vessel name and the lower limit threshold may be 0 changes of the vessel name.

For example, the vessel name behavior profile may define an expected number of vessel name changes calculated using the equation:

Expected name changes=[(2*Interquartile range (IQR)$^6$)+75*th* Percentile

The determined vessel name behavior profile may be stored in vessel name profile database 520. The vessel name profile database 520 may be provided by database 110 (see FIG. 1). The name behavior profile in vessel name profile database 520 may be associated with the unique vessel identifier.

At 521, vessel name anomaly (or abnormal behavior event) detection may be performed. The vessel name anomaly detection may compare the vessel name history from vessel name history database 518 for a vessel against the determined vessel profile from vessel name profile database 520. This may involve, for example, comparing one or more data points from a vessel to the lower name change limit, the upper name change limit. This may further involve determining whether the number of name changes falls within a lower quartile and an upper quartile. Outlier detection may be used in order to identify anomaly events within the one or more segments of a vessel in the vessel name history.

The anomaly events may be identified and stored in vessel name anomaly history database 522. The vessel name anomaly history database 522 may be provided by database 110 (see FIG. 1). The vessel name anomaly history in vessel name anomaly history database 522 may be associated with the unique vessel identifier.

Port Visit Anomalies

The port visit anomaly pipeline is described in FIG. 5, and includes steps 524, 525, 527, 528, 529 and 530. Additionally, the vessel visit duration anomaly pipeline is described in FIG. 5 and include steps 531, 532, 533, and 534.

Vessel movement anomalies can include anomalies based on destination and visit duration.

As described above, at 510 a unique vessel identifier based on the unique vessel signature may be assigned to a vessel.

At 523, data points are classified. The classification can include classification into "moving", "port", "anchorage", and "hop". The classification may assigns labels to the data points. The classification may be implemented using a finite state machine. The vessel tracking data may include positional information (latitude, longitude) which may be used to generate inferred states of the vessel (i.e. that the vessel is either in a static or transition state). For a grouping of vessel tracking data (i.e. a segment) to be considered static, a plurality of vessel tracking data showing the vessel position remaining within a small squared area is required. Once the vessel tracking data has been labelled as static or transition the inferred states may be further labelled based on the probability of switching between a static and transition state. This may permit further vessel movement classification states such as 'anchor', 'port', 'hop', and 'moving'. From these states a hop may be a small distance transition that takes place in between two static groups of messages. This may include identifying several sequential data points corresponding to movement during a vessel trip, i.e. "moving" classification where the vessel is underway between its origin and its destination. The "moving" classification may be based on the location of the vessel and its speed, which may be decoded from the vessel tracking data in the one or more segments. Port classifications may be determined by identifying sequential data points corresponding to the vessel arriving at and sitting docked in port, i.e. the "port" class. Anchorage classifications may be made by identifying sequential data points corresponding to the vessel parked in anchorage, i.e. the "anchorage" class, where the vessel is anchored. Hop classifications may be a short port visit between the port of origin and the final destination port or anchorage.

At 524, a port visit may be identified or detected from the one or more segments received from 523. This may involve determining from the one or more segments, the location of the port, the duration of the stay, and other relevant data based on the vessel's stay at the port. A port visit is characterized by the final destination port of a vessel trip.

The identified port visits from the one or more segments may be stored in a vessel visit history database 525. The vessel visit history database may be provided by database 110 (see FIG. 1). The vessel visit history in vessel visit history database 525 may be associated with the unique vessel identifier.

At 527, a vessel destination behavior profile may be generated based on the vessel visit history received from vessel visit history database 525. The profile may be a statistical model, such as a distribution related to the number of destinations the vessel visits. The profile may include statistics such as the maximum, minimum, mean, median, standard deviation, and the 10th, 25th, 75th and 90th percentiles for vessel destinations (i.e. how frequently the destination changes) for each vessel and at different ocean regions. The profile may further include an upper limit, lower limit, upper quartile and lower quartile related to the vessel destinations. The vessel profile may include upper limit, lower limit, upper quartile and lower quartile related to changes to the vessel destinations, for example, an upper limit threshold may be 8 visits to a particular destination and the lower limit threshold may be 1 visit to the particular destination. For example, a vessel visits the port of Vancouver every month. If there is a change of this destination visit frequency, an anomaly may be determined. The vessel profile may be determined for a vessel, a type of vessel, for a geographic zone, or a combination thereof.

For example, the vessel destination behavior profile may define an expected number of visits to a destination calculated using the equation:

$$\text{Expected visits} = [(2 * \text{Interquartile range}(IQR)^6) + 75th \text{ Percentile}]$$

The determined vessel destination behavior profile may be stored in vessel destination profile database 528. The vessel destination profile database 528 may be provided by database 110 (see FIG. 1). The destination behavior profile in vessel destination profile database 528 may be associated with the unique vessel identifier.

At 529, vessel destination anomaly (or abnormal behavior event) detection may be performed. The vessel destination anomaly detection may compare the vessel visit history from vessel visit history database 525 for a vessel against the determined vessel profile from vessel destination profile database 528. This may involve, for example, comparing one or more segments from a vessel to the lower destination visit limit, the upper destination visit limit. This may further involve determining whether the number (or the change in the number) of visits to a destination falls within a lower quartile and an upper quartile. Outlier detection may be used in order to identify destination anomaly events within the one or more segments of a vessel in the vessel visit history. The vessel profile may define statistics based on the number of visits by the vessel to a particular destination.

The anomaly events may be identified and stored in vessel destination anomaly history database 530. The vessel destination anomaly history database 530 may be provided by database 110 (see FIG. 1). The vessel destination anomaly history in vessel destination anomaly history database 530 may be associated with the unique vessel identifier.

At 531, a vessel visit duration behavior profile may be generated based on the vessel visit history received from vessel visit history database 525. The profile may be a statistical model, such as a distribution related to the length of a visit by the vessel. The profile may include statistics such as the maximum, minimum, mean, median, standard deviation, and the 10th, 25th, 75th and 90th percentiles for the visit duration for each vessel and at different ocean regions. The profile may further include an upper limit, lower limit, upper quartile and lower quartile related to the vessel visit duration. The vessel profile may include upper limit, lower limit, upper quartile and lower quartile related to the length of vessel visit, for example, a upper limit threshold may be 31 days in visit length, and the lower limit threshold may be 3 days in visit length. The vessel visit duration profile may include a tolerance of, for example 1-2 days. The vessel profile may be determined for a vessel, a type of vessel, for a geographic zone, or a combination thereof.

The determined vessel visit duration behavior profile may be stored in vessel visit duration profile database 532. The vessel visit duration profile database 532 may be provided by database 110 (see FIG. 1). The vessel visit duration behavior profile in vessel visit duration profile database 532 may be associated with the unique vessel identifier.

For example, the vessel visit behavior profile may define an expected number of vessel trip visit duration changes calculated using the equation:

$$\text{Expected trip visit duration} = [(2 * \text{Interquartile range} (IQR)^6) + 75th \text{ Percentile}]$$

At 533, vessel visit duration anomaly (or abnormal behavior event) detection may be performed. The vessel visit duration anomaly detection may compare the vessel visit history from vessel visit history database 525 for a vessel against the determined vessel profile from vessel visit duration profile database 532. This may involve, for example, comparing one or more segments from a vessel to the lower visit duration limit, the upper visit duration limit. This may further involve determining whether the length of visit falls within a lower quartile and an upper quartile. While the examples above use a number of days as the determination of visit length, another unit of time including minutes, hours, weeks, months, etc. may be used instead. Outlier detection may be used in order to identify visit duration anomaly events within the one or more segments of a vessel in the vessel visit history. The vessel profile may define statistics based on the average visit length for visits at a destination by the vessel. The vessel profile may describe visit duration for port visits or anchorage visits, either separately or in combination.

The anomaly events may be identified and stored in vessel visit duration anomaly history database 534. The vessel visit duration anomaly history database 534 may be provided by database 110 (see FIG. 1). The vessel visit duration anomaly history in vessel visit duration anomaly history database 534 may be associated with the unique vessel identifier.

Vessel Trip Anomalies

The vessel trip anomaly pipeline is described in FIG. 5, and includes steps 535, 536, 537, 538, 539 and 540.

Vessel trips may be determined based on the received vessel movement classifications from 523 of the vessel segments. Vessel trips may include a starting location, a destination location (including a port or anchorage), and one or more segments between the starting location and the destination location.

As described above, at 510 a unique vessel identifier based on the unique vessel signature may be assigned to a vessel.

At 535, a vessel trip may be identified or detected from the one or more segments received from 523. This may involve determining from the one or more segments, the location of the port of origin, the duration of the trip, the location of the destination port or anchorage, and other relevant data based on the vessel's time at sea.

Based on the data points classification of 523, the vessel trajectories may be segmented into trips at 535. Trips are a set of data points that are in-between two point classified as port.

The identified vessel trip from the one or more segments may be stored in a vessel trip history database 536. The vessel trip history database may be provided by database 110 (see FIG. 1). The vessel trip history in vessel trip history database 536 may be associated with the unique vessel identifier.

At 537, a vessel trip duration behavior profile may be generated based on the vessel trip history received from vessel trip history database 536. The profile may be a statistical model, such as a distribution related to the length of a trip by the vessel. The profile may further include an upper limit, lower limit, upper quartile and lower quartile related to the vessel trip duration. The profile may include statistics such as the maximum, minimum, mean, median, standard deviation, and the 10th, 25th, 75th and 90th percentiles for the trip duration for each vessel and at different ocean regions. The vessel profile may include upper limit, lower limit, upper quartile and lower quartile related to the length of vessel trip, for example, a upper limit threshold may be 100 days in trip length, and the lower limit threshold may be 5 days in trip length The vessel profile may be determined for a particular vessel, a type of vessel, for a geographic zone, or a combination thereof.

For example, the vessel trip duration profile may define an expected trip duration calculated using the equation:

$$\text{Expected duration} = [(2*\text{Interquartile range}(IQR)^6) + 75th \text{ Percentile}]$$

The determined vessel trip duration behavior profile may be stored in vessel trip duration profile database 538. The vessel trip duration profile database 538 may be provided by database 110 (see FIG. 1). The vessel trip duration behavior profile in vessel trip duration profile database 538 may be associated with the unique vessel identifier.

At 539, vessel trip duration anomaly (or abnormal behavior event) detection may be performed. The vessel trip duration anomaly detection may compare the vessel trip history from vessel trip history database 536 for a vessel against the determined vessel profile from vessel trip duration profile database 538. This may involve, for example, comparing one or more segments from a vessel to the lower trip duration limit, the upper trip duration limit. This may further involve determining whether the length of trip falls within a lower quartile and an upper quartile. While the examples above use a number of days as the determination of trip length, another unit of time including minutes, hours, weeks, months, etc. may be used instead. Outlier detection may be used in order to identify trip duration anomaly events within the one or more segments of a vessel in the vessel trip history. The vessel profile may define statistics based on the upper and lower limit of trip length for trips at sea by the vessel.

The anomaly events may be identified and stored in vessel trip duration anomaly history database 540. The vessel trip duration anomaly history database 540 may be provided by database 110 (see FIG. 1). The vessel trip duration anomaly history in vessel trip duration anomaly history database 540 may be associated with the unique vessel identifier.

Vessel Trip Movement State Anomalies

The vessel trip movement state anomaly pipeline is described in FIG. 5, and includes steps 542, 543, 544, 545, 546 and 547.

Vessel movement anomalies may include anomalies based on the vessel's movement state i.e., stop and moving.

As described above, at 510 a unique vessel identifier based on the unique vessel signature may be assigned to a vessel.

At 541, enhanced vessel tracking data including region boundaries is received from 508, including unique vessel identifiers from 510, in addition to vessel trip history from 536 and trip movement classification is performed. The trip movement state classification may identify or detect one or more segments belonging to a particular trip of a vessel. Individual classifications of segments within the trip may include, for example, "stopped" and "moving". The trip movement state classification may add a label to each data point. For example, when the speed is below a threshold (or based on another constraints), the vessel may have stopped in the middle of a trip. In an alternate example, a fishing vessel may have a lot of stop and go(s) changes to dispatch nets or collect catch. In another alternate example, a cargo vessel has a low threshold for stop and go changes during a trip, and even a very small change may result in a detected anomaly.

Trips identified at 535 may be segmented into smaller segments that represent "moving" points connected "hops" and "anchorage" points.

At 542, trip stop and go points are detected. This may include points within one or more segments where a vessel stopped, or where a vessel began moving again.

The identified vessel stop and go points from the one or more segments may be stored in a vessel trip movement history database 543. The vessel movement history database may be provided by database 110 (see FIG. 1). The vessel movement history in vessel movement history database 543 may be associated with the unique vessel identifier.

At 544 a vessel movement behavior profile may be generated. The profile may be a statistical model, such as a distribution related to determined values of the movement along a trip by the vessel. The profile may include statistics such as the maximum, minimum, mean, median, standard deviation, and the 10th, 25th, 75th and 90th percentiles for the vessel state change frequency for each vessel and at different ocean regions. The profile may further include an upper limit, lower limit, upper quartile and lower quartile related to the vessel movements during a trip. The vessel profile may include upper limit, lower limit, upper quartile and lower quartile related to the vessel movements, for example, a upper limit threshold may be 3 stops during a trip, and the lower limit threshold may be 0 stops during a trip. The vessel profile may be determined for a vessel, a type of vessel, for a geographic zone, or a combination thereof.

For example, the vessel movement behavior profile may define an expected number of stops during a trip calculated using the equation:

$$\text{Expected stops} = [(2*\text{Interquartile range}(IQR)^6) + 75th \text{ Percentile}]$$

The determined vessel movement behavior profile may be stored in vessel movement profile database 545. The vessel movement profile database 545 may be provided by database 110 (see FIG. 1). The vessel movement behavior profile in vessel movement profile database 545 may be associated with the unique vessel identifier.

At 546, vessel movement anomaly (or abnormal behavior event) detection may be performed. The vessel movement anomaly detection may compare the vessel movement history from vessel movement history database 543 for a vessel against the determined vessel profile from vessel movement profile database 545. This may involve, for example, comparing the number of state changes in the one or more segments from a vessel to the lower and upper limit of trip state changes. The vessel movement anomalies may be identified for a trip if a vessel has more stops, hops, or other movement state changes than expected by the vessel profile.

The anomaly events may be identified and stored in vessel movement anomaly history database 547. The vessel movement anomaly history database 547 may be provided by database 110 (see FIG. 1). The vessel movement anomaly history in vessel movement anomaly history database 547 may be associated with the unique vessel identifier.

Vessel Speed Anomalies

The vessel speed anomaly pipeline is described in FIG. 5, and includes steps 548, 549, 550, 551, 552 and 553.

Vessel speed anomalies may be determined based on the reported speed information from the vessel tracking data. This may be, for example, where a vessel is travelling at a different speed that is outside their normal speed profile.

As described above, at 510 a unique vessel identifier based on the unique vessel signature may be assigned to a vessel.

At 548, a vessel speed may be identified or decoded from the one or more segments. The vessel speed may be decoded from the vessel tracking data in the one or more segments. The vessel speed determined for the one or more segments may be speed through the water, speed over ground, speed made good, or another speed value of the vessel. Speed may be determined based on the vessel tracking data (i.e. the vessel may transmit their speed), or may alternatively be determined using dead reckoning based on position.

The identified vessel speed from the one or more segments may be stored in a vessel speed history database 549. The vessel speed history database may be provided by database 110 (see FIG. 1). The vessel speed history in vessel speed history database 549 may be associated with the unique vessel identifier.

At 550, a vessel speed behavior profile may be generated based on the vessel speed history received from vessel speed history database 549. The profile may be a statistical model, such as a distribution related to the vessel speed. The profile may include statistics such as the maximum, minimum, mean, median, standard deviation, and the 10th, 25th, 75th and 90th percentiles for the vessel speed for each vessel and at different ocean regions. The profile may further include an upper limit, lower limit, upper quartile and lower quartile related to the vessel speed. The vessel profile may include upper limit, lower limit, upper quartile and lower quartile related to the vessel speed, for example, an upper limit threshold may be 20 knots and the lower limit threshold may be 2 knots. The upper limit, lower limit, upper quartile, and lower quartile may be in knots, km/hr, mph, or another speed unit as known. The vessel profile may be determined for a vessel, a type of vessel, for a geographic zone, or a combination thereof.

For example, the vessel speed profile may define an expected speed in each region is calculated by using the equation:

Expected speed=$[(2*\text{Interquartile range(IQR)}^6)+75th$ Percentile

The determined vessel speed behavior profile may be stored in vessel speed profile database 551. The vessel speed profile database 551 may be provided by database 110 (see FIG. 1). The vessel speed behavior profile in vessel speed profile database 551 may be associated with the unique vessel identifier.

At 552, vessel speed anomaly (or abnormal behavior event) detection may be performed. The vessel speed anomaly detection may compare the vessel speed history from vessel speed history database 549 for a vessel against the determined vessel profile from vessel speed profile database 551. This may involve, for example, comparing the speed from one or more segments from a vessel to the lower speed limit, the upper speed limit. This may further involve determining whether the speed falls within a lower quartile and an upper quartile. Outlier detection may be used in order to identify anomaly events within the one or more segments of a vessel in the vessel speed history.

The anomaly events may be identified and stored in vessel speed anomaly history database 553. The vessel speed anomaly history database 553 may be provided by database 110 (see FIG. 1). The vessel speed anomaly history in vessel speed anomaly history database 553 may be associated with the unique vessel identifier.

Vessel Tracking Transmission Anomalies

The vessel tracking anomaly pipeline is described in FIG. 5, and includes steps 554, 555, 556, 557, 558 and 559.

Vessel tracking transmissions anomalies may be determined based on the reported vessel tracking data transmissions. This may be, for example, where a vessel is reporting vessel tracking data at a different rate, or where there are gaps in the transmissions of vessel tracking data from a vessel.

As described above, at 510 a unique vessel identifier based on the unique vessel signature may be assigned to a vessel.

At 554, vessel tracking transmissions may be identified or decoded from the one or more segments. The vessel tracking transmissions may be decoded from the vessel tracking data in the one or more segments, and may represent transmissions by a vessel tracking transceiver aboard a vessel.

The identified vessel tracking transmissions from the one or more segments may be stored in a vessel tracking transmissions history database 555. The vessel tracking transmissions history database may be provided by database 110 (see FIG. 1). The vessel tracking transmissions history in vessel tracking transmissions history database 555 may be associated with the unique vessel identifier.

At 556, a vessel tracking transmissions behavior profile may be generated based on the vessel tracking transmissions history received from vessel tracking transmissions history database 555. The profile may be a statistical model, such as a distribution related to the presence, absence, or frequency of vessel tracking transmissions. The profile may include statistics such as the maximum, minimum, mean, median, standard deviation, and the 10th, 25th, 75th and 90th percentiles for the vessel tracking transmissions for each vessel and at different ocean regions. The profile may further include an upper limit, lower limit, upper quartile and lower quartile related to the vessel tracking transmissions. The vessel profile may include upper limit, lower limit, upper quartile and lower quartile related to the vessel tracking transmissions, for example, an upper limit threshold may be 1 transmission per minute and the lower limit threshold may be 1 transmission per hour. The upper limit, lower limit, upper quartile, and lower quartile may be in transmissions per hour, transmissions per minute, Hertz, or another unit as known. The vessel profile may be determined for a vessel, a type of vessel, for a geographic zone, or a combination thereof.

For example, the vessel tracking transmissions behavior profile may define an expected number of transmissions calculated using the equation:

Expected transmissions=$[(2*\text{Interquartile range (IQR)}^6)+75th$ Percentile The determined vessel tracking transmissions behavior profile may be stored in vessel tracking transmissions profile database 557. The vessel tracking transmissions profile database 557 may be provided by database 110 (see FIG. 1). The tracking transmissions behavior profile in vessel tracking transmissions profile database 557 may be associated with the unique vessel identifier.

At 558, vessel tracking transmissions anomaly (or abnormal behavior event) detection may be performed. The vessel tracking transmissions anomaly detection may compare the vessel tracking transmissions history from vessel tracking transmissions history database 555 for a vessel against the determined vessel profile from vessel tracking transmissions profile database 557. This may involve, for example, comparing the vessel tracking transmission frequency from one or more segments from a vessel to the lower tracking transmissions limit, the upper tracking transmissions limit. This may further involve determining whether the tracking transmissions frequency falls within a lower quartile and an upper quartile. Outlier detection may be used in order to identify anomaly events within the one or more segments of a vessel in the vessel tracking transmissions history.

Vessel tracking transmission anomalies may depend on region and may change. The anomalies may be determined based upon a statistical analysis of the vessel tracking data to determine outliers. These anomalies may include whether vessel tracking data has been sent throughout a vessel's trip. Other parameters may be used in order to determine vessel tracking transmission anomalies, including how long the vessel has been known (20 years, 6 months, etc.), vessel identifiers, the age of the vessel, and other anomalous behaviors as compared to the region. For example, for a given vessel, the vessel tracking data could represent a new vessel, or a bad actor manipulating the signal and changing the vessel tracking identifier.

The anomaly events may be identified and stored in vessel tracking transmissions anomaly history database 559. The vessel tracking transmissions anomaly history database 559 may be provided by database 110 (see FIG. 1). The vessel tracking transmissions anomaly history in vessel tracking transmissions anomaly history database 559 may be associated with the unique vessel identifier.

Vessel Tracking Accordance Anomalies

The vessel tracking accordance anomaly pipeline is described in FIG. 5, and includes steps 560, 561, 562, 563, 564 and 565.

Vessel tracking accordance anomalies may be determined based on the reported position feasibility of the vessel. This may be, for example, where a vessel is reporting vessel position at an expected location as it was expected given its past trajectory. These position data points that are not in accordance with the vessel past trajectory may be referred to as glitches. For example, for a give vessel it may be determined that it would be impossible that the vessel would achieve the reported location given the speed and distance navigated. Glitches including positional points that are incorrect, may be caused intentionally or unintentionally by the vessel or a by a vessel tracking transmission problem. Glitches may be more frequent in some geographical regions than others.

As described above, at 510 a unique vessel identifier based on the unique vessel signature may be assigned to a vessel.

At 560, vessel tracking accordance may be identified or decoded from the one or more segments. The vessel tracking accordance may be decoded from the vessel tracking data in the one or more segments, and may represent accordance by a vessel tracking transceiver aboard a vessel.

The identified vessel tracking accordance from the one or more segments may be stored in a vessel tracking accordance history database 561. The vessel tracking accordance history database may be provided by database 110 (see FIG. 1). The vessel tracking accordance history in vessel tracking accordance history database 561 may be associated with the unique vessel identifier.

At 562, a vessel tracking accordance behavior profile may be generated based on the vessel tracking accordance history received from vessel tracking accordance history database 561. The profile may be a statistical model, such as a distribution related to the level of vessel tracking accordance. The profile may include statistics such as the maximum, minimum, mean, median, standard deviation, and the 10th, 25th, 75th and 90th percentiles for the vessel tracking accordance for each vessel and at different ocean regions. The profile may further include an upper limit, lower limit, upper quartile and lower quartile related to the vessel tracking accordance. The vessel profile may include upper limit, lower limit, upper quartile and lower quartile related to the vessel tracking accordance, for example, a upper limit threshold may be a 5 glitches per trip and the lower limit threshold may be 0. The upper limit, lower limit, upper quartile, and lower quartile may be accordance values such as predetermined levels of position accuracy. The vessel profile may be determined for a vessel, a type of vessel, for a geographic zone, or a combination thereof.

For example, the vessel tracking accordance behavior profile may define an expected number of transmission glitches during a trip calculated using the equation:

$$\text{Expected glitches} = [(2 * \text{Interquartile range(IQR)}^6) + 75th \text{ Percentile}]$$

The determined vessel tracking accordance behavior profile may be stored in vessel tracking accordance profile database 563. The vessel tracking accordance profile database 563 may be provided by database 110 (see FIG. 1). The vessel tracking accordance behavior profile in vessel tracking accordance profile database 563 may be associated with the unique vessel identifier.

At 564, vessel tracking accordance anomaly (or abnormal behavior event) detection may be performed. The vessel tracking accordance anomaly detection may compare the vessel tracking accordance history from vessel tracking accordance history database 561 for a vessel against the determined vessel profile from vessel tracking accordance profile database 563. This may involve, for example, comparing the number of glitches from one or more segments from a vessel to the lower tracking accordance limit, the upper tracking accordance limit. This may further involve determining whether the tracking accordance falls within a lower quartile and an upper quartile. Outlier detection may be used in order to identify anomaly events within the one or more segments of a vessel in the vessel tracking accordance history.

The anomaly events may be identified and stored in vessel tracking accordance anomaly history database 565. The vessel tracking accordance anomaly history database 565 may be provided by database 110 (see FIG. 1). The vessel tracking accordance anomaly history in vessel tracking accordance anomaly history database 565 may be associated with the unique vessel identifier.

Vessel Sea Route Anomalies

The vessel sea route anomaly pipeline is described in FIG. 5, and includes steps 566, 567, 568, 569, 570 and 571.

Vessel sea route deviation anomalies may be determined based on the (geographic boundaries of) route the vessel is taking as compared with historical routes. This may be, for example, where a vessel significantly departs from a particular sea route used in the vessel trip history 536 between an origin and a destination. The deviation may be based on a geographical distance, or the selected sea route as described geographical boundaries. For example, if the vessel changes from using a "main" route to a "non-main" route from an origin port to a destination port, such a change may trigger an anomaly if it deviates from the expectation.

As described above, at 510 a unique vessel identifier based on the unique vessel signature may be assigned to a vessel.

At 566, vessel sea route may be identified or decoded from the one or more segments. The vessel sea route may be decoded from the vessel tracking data in the one or more segments, and may represent the deviation from a historical sea route between an origin and a destination.

The identified vessel sea route from the one or more segments may be stored in a vessel sea route history database 567. The vessel sea route history database may be provided by database 110 (see FIG. 1). The vessel sea route history in vessel sea route history database 567 may be associated with the unique vessel identifier.

At 568, a vessel sea route behavior profile may be generated based on the vessel sea route history received from vessel sea route history database 567. The profile may be a statistical model, such as a distribution related to the vessel sea route. The profile may include statistics such as the maximum, minimum, mean, median, standard deviation, and the 10th, 25th, 75th and 90th percentiles for the vessel route deviations for each vessel and at different ocean regions. The profile may further include an upper limit, lower limit, upper quartile and lower quartile related to the vessel sea route. The vessel profile may include upper limit, lower limit, upper quartile and lower quartile related to the deviation from the vessel sea route, for example, an upper limit threshold may be a 10 km deviation and the lower limit threshold may be 0 km. The upper limit, lower limit, upper quartile, and lower quartile may be distance values, or percentage values. The vessel profile may be determined for a vessel, a type of vessel, for a geographic zone, or a combination thereof.

For example, the vessel sea route behavior profile may define an expected deviation from a sea route calculated using the equation:

$$\text{Expected deviation} = [(2*\text{Interquartile range}(IQR)^6)+ 75th \text{ Percentile}$$

The determined vessel sea route behavior profile may be stored in vessel sea route profile database 569. The vessel sea route profile database 569 may be provided by database 110 (see FIG. 1). The vessel sea route behavior profile in vessel sea route profile database 569 may be associated with the unique vessel identifier.

At 570, vessel sea route anomaly (or abnormal behavior event) detection may be performed. The vessel sea route anomaly detection may compare the vessel sea route history from vessel sea route history database 567 for a vessel against the determined vessel profile from vessel sea route profile database 569. This may involve, for example, comparing the sea route deviation for one or more segments from a vessel to the lower sea route limit, the upper sea route limit. This may further involve determining whether the sea route falls within a lower quartile and an upper quartile. Outlier detection may be used in order to identify anomaly events within the one or more segments of a vessel in the vessel sea route history.

Vessel sea route anomalies may be determined inside a particular economic zone, a maritime zone, or a port. This can be done by determining the position of a vessel, and comparing with a predicted or expected location.

A shape profile and models may be used to describe a route, a port, or any other maritime zone. A port is shown as a single point such as a dot on a map, but may have anchorage areas and specific designated areas for vessels separate from the port itself. A sea route may be a polygon that may contain other specific areas. The sea route anomaly detection may include a statistical analysis about where the port actually is, including anchorages and other designated areas for vessels. This may be done by creating a data driven route for vessels navigating from a origin port to a destination particular port.

This may be performed using a dataset to determine the historical behavior in the particular port area, including pilots coming in to park, waiting lines, and various regions in a port area. This may include determining using geofencing and data analysis, which may looks at the density of vessel traffic over time, based on historic data.

In addition to ports, marine protected areas may have their own models in order to determine anomalies as compared to expected behavior.

The sea route anomalies may be determined by generating expected vessel behaviors, and comparing the predicted behavior to the observed behavior.

The anomaly events may be identified and stored in vessel sea route anomaly history database 571. The vessel sea route anomaly history database 571 may be provided by database 110 (see FIG. 1). The vessel sea route anomaly history in vessel sea route anomaly history database 571 may be associated with the unique vessel identifier.

Vessel Crew Size Anomalies

The vessel crew size anomaly pipeline is described in FIG. 5, and includes steps 572, 573, 574, 575, 576 and 577.

Vessel crew size anomalies may be determined based on the reported crew manifests of the vessel as compared with historical trips. This may be, for example, where a vessel significantly departs from a particular crew size used in the vessel trip history 536 between an origin and a destination.

As described above, at 510 a unique vessel identifier based on the unique vessel signature may be assigned to a vessel.

At 572, vessel crew size may be identified or decoded from the one or more segments along with the vessel data 350. The vessel crew size may be decoded from the vessel data 350 and the vessel tracking data in the one or more segments. The crew size data determined from the vessel data 350 may include crew manifest changes (for example when a crew member joins or leaves a vessel), temporary crew manifest changes (for example, when a temporary captain comes aboard for navigation through a particular area), and passenger manifest changes.

The identified vessel crew size from the one or more segments may be stored in a vessel crew size history database 573. The vessel crew size history database may be provided by database 110 (see FIG. 1). The vessel crew size history in vessel crew size history database 573 may be associated with the unique vessel identifier.

At 574, a vessel crew size behavior profile may be generated based on the vessel crew size history received from vessel crew size history database 573. The profile may be a statistical model, such as a distribution related to the level of vessel crew size. The profile may include statistics such as the maximum, minimum, mean, median, standard deviation, and the 10th, 25th, 75th and 90th percentiles for the crew size for each vessel and at different ocean regions. The profile may further include an upper limit, lower limit, upper quartile and lower quartile related to the vessel crew size. The vessel profile may include upper limit, lower limit, upper quartile and lower quartile related to the deviation from the vessel crew size, for example, an upper limit threshold may be 100 crew members and the lower limit threshold may be 50 crew members. The upper limit, lower limit, upper quartile, and lower quartile may be actual crew sizes, or percentage values. The vessel profile may be determined for a vessel, a type of vessel, for a geographic zone, or a combination thereof.

For example, the vessel crew size behavior profile may define an expected crew size for a vessel calculated using the equation:

$$\text{Expected crew size} = [(2*\text{Interquartile range}(IQR)^6)] + 75th \text{ Percentile}$$

The determined vessel crew size behavior profile may be stored in vessel crew size profile database 575. The vessel crew size profile database 575 may be provided by database 110 (see FIG. 1). The vessel crew size behavior profile in vessel crew size profile database 575 may be associated with the unique vessel identifier.

At 576, vessel crew size anomaly (or abnormal behavior event) detection may be performed. The vessel crew size anomaly detection may compare the vessel crew size history from vessel crew size history database 573 for a vessel against the determined vessel profile from vessel crew size profile database 575. This may involve, for example, comparing the crew size from one or more segments from a vessel to the lower crew size limit, the upper crew size limit. This may further involve determining whether the crew size falls within a lower quartile and an upper quartile. Outlier detection may be used in order to identify anomaly events within the one or more segments of a vessel in the vessel crew size history.

The anomaly events may be identified and stored in vessel crew size anomaly history database 577. The vessel crew size anomaly history database 577 may be provided by database 110 (see FIG. 1). The vessel crew size anomaly history in vessel crew size anomaly history database 577 may be associated with the unique vessel identifier.

Vessel Incident Anomalies

The vessel incident anomaly pipeline is described in FIG. 5, and includes steps 578, 579, 580, 581, 582 and 583.

Vessel incident anomalies may be determined based on the reported vessel incidents of the vessel incident data 352 as compared with historical profiles. This may be, for example, where a vessel encounters a number of incidents between an origin and a destination.

As described above, at 510 a unique vessel identifier based on the unique vessel signature may be assigned to a vessel.

At 578, the vessel incident may be identified or decoded from the one or more segments along with the vessel incident data 352. The vessel incident may be decoded from the vessel data 352 and the vessel tracking data in the one or more segments. The incident data determined from the vessel data 352 may include vessel incidents at sea as recorded by vessel logs, including non-conformity with regulations and equipment failure. Other activities that may be provided in the vessel incident data provided by the vessel incident provider 310a may include flooding, defective components or equipment failures, collisions with vessels, allisions with fixed objects, crew fatigue, maintenance issues, etc.

The identified vessel incident from the one or more segments may be stored in a vessel incident history database 579. The vessel incident history database may be provided by database 110 (see FIG. 1). The vessel incident history in vessel incident history database 579 may be associated with the unique vessel identifier.

At 580, a vessel incident behavior profile may be generated based on the vessel incident history received from vessel incident history database 579. The profile may be a statistical model, such as a distribution related to the level of vessel incident. The profile may include statistics such as the maximum, minimum, mean, median, standard deviation, and the 10th, 25th, 75th and 90th percentiles for the incidents for each vessel and at different ocean regions. The profile may further include an upper limit, lower limit, upper quartile and lower quartile related to the vessel incident. The vessel profile may include upper limit, lower limit, upper quartile and lower quartile related to the deviation from the vessel incident, for example, an upper limit threshold may be 2 incidents, and a lower limit threshold may be 0 incidents. The upper limit, lower limit, upper quartile, and lower quartile may be actual incident numbers, or percentage values. The vessel profile may be determined for a vessel, a type of vessel, for a geographic zone, or a combination thereof.

For example, the vessel incident behavior profile may define an expected number of incidents from a vessel calculated using the equation:

$$\text{Expected incidents} = [(2*\text{Interquartile range}(IQR)^6)] + 75th \text{ Percentile}$$

The determined vessel incident behavior profile may be stored in vessel incident profile database 581. The vessel incident profile database 581 may be provided by database 110 (see FIG. 1). The incident behavior profile in vessel incident profile database 581 may be associated with the unique vessel identifier.

At 582, vessel incident anomaly (or abnormal behavior event) detection may be performed. The vessel incident anomaly detection may compare the vessel incident history from vessel incident history database 579 for a vessel against the determined vessel profile from vessel incident profile database 581. This may involve, for example, comparing the number of incidents from one or more segments from a vessel to the lower incident limit, the upper incident limit. This may further involve determining whether the incident numbers falls within a lower quartile and an upper quartile. Outlier detection may be used in order to identify anomaly events within the one or more segments of a vessel in the vessel incident history.

The anomaly events may be identified and stored in vessel incident anomaly history database 583. The vessel incident anomaly history database 583 may be provided by database 110 (see FIG. 1). The vessel incident anomaly history in vessel incident anomaly history database 583 may be associated with the unique vessel identifier.

Vessel Rendezvous Detection

The vessel trip anomaly pipeline is described in FIG. 5, and includes steps 585, 586, 587, 588, 589 and 590.

Vessel rendezvous anomalies may be determined based on unstable vessel speed, and/or proximity to other vessels transmitting vessel tracking data as compared with historical profiles. This may be, for example, where a vessel performs a number of rendezvous' with another vessel while at sea between an origin and a destination.

As described above, at 510 a unique vessel identifier based on the unique vessel signature may be assigned to a vessel.

At 584, the segments having unstable speed may be identified from the one or more segments. This may include identifying segments for a vessel underway at sea where the vessels speed falls outside of the average for the trip, or is otherwise inconsistent with other segments.

At 585, vessel rendezvous' may be identified from the one or more segments along with the identified rendezvous from 584. The vessel rendezvous may be decoded from the vessel tracking data in the one or more segments.

The identified vessel rendezvous from the one or more segments may be stored in a vessel rendezvous history database 586. The vessel rendezvous history database may be provided by database 110 (see FIG. 1). The vessel rendezvous history in vessel rendezvous history database 586 may be associated with the unique vessel identifier.

At 587, a vessel rendezvous behavior profile may be generated based on the vessel rendezvous history received from vessel rendezvous history database 586. The profile may be a statistical model, such as a distribution related to the level of vessel rendezvous. The profile may include statistics such as the maximum, minimum, mean, median, standard deviation, and the 10th, 25th, 75th and 90th percentiles for the rendezvous for each vessel and at different ocean regions. The profile may further include an upper limit, lower limit, upper quartile and lower quartile related to the vessel rendezvous. The vessel profile may include upper limit, lower limit, upper quartile and lower quartile related to the deviation from the vessel rendezvous, for example, an upper limit threshold may be 2 rendezvous, and a lower limit threshold may be 0 rendezvous. The upper limit, lower limit, upper quartile, and lower quartile may be actual rendezvous numbers, or percentage values. The vessel profile may be determined for a vessel, a type of vessel, for a geographic zone, or a combination thereof.

For example, the vessel rendezvous behavior profile may define an expected number of rendezvous calculated using the equation:

Expected number of rendezvous=[(2*Interquartile range(IQR)$^6$)+75th Percentile

The determined vessel rendezvous behavior profile may be stored in vessel rendezvous profile database 588. The vessel rendezvous profile database 588 may be provided by database 110 (see FIG. 1). The rendezvous behavior profile in vessel rendezvous profile database 588 may be associated with the unique vessel identifier.

At 589, vessel rendezvous anomaly (or abnormal behavior event) detection may be performed. The vessel rendezvous anomaly detection may compare the vessel rendezvous history from vessel rendezvous history database 586 for a vessel against the determined vessel profile from vessel rendezvous profile database 588. This may involve, for example, comparing one or more segments from a vessel to the lower rendezvous limit, the upper rendezvous limit. This may further involve determining whether the rendezvous numbers fall within a lower quartile and an upper quartile. Outlier detection may be used in order to identify anomaly events within the one or more segments of a vessel in the vessel rendezvous history.

The anomaly events may be identified and stored in vessel rendezvous anomaly history database 590. The vessel rendezvous anomaly history database 590 may be provided by database 110 (see FIG. 1). The vessel rendezvous anomaly history in vessel rendezvous anomaly history database 590 may be associated with the unique vessel identifier.

Output to Risk Analysis Engine

Figure 6:
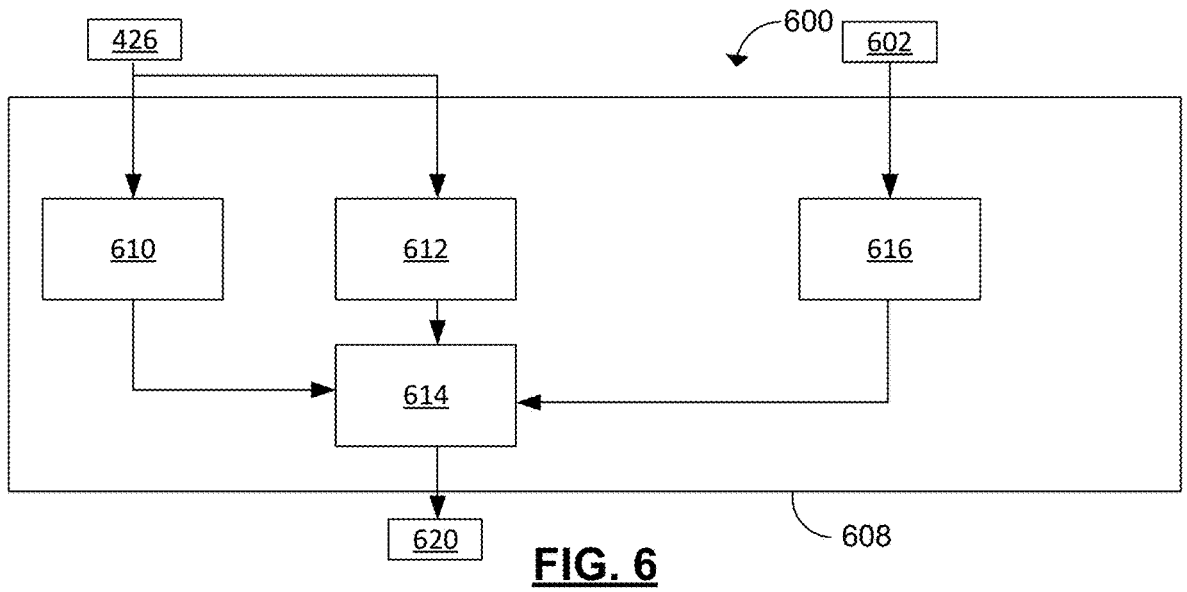
FIG. 6 shows a method diagram of analyzing vessel risk in accordance with one or more embodiments.

Referring next to FIG. 6, there is a method diagram 600 for analyzing vessel risk in accordance with one or more embodiments. The method diagram 600 shows the determination of one or more prediction models 616 as described in more detail in FIGS. 10 and 12.

As shown, the anomaly history 526a for each of the parameters, and the detected anomalies 526b (see FIG. 5) for each of the parameters of the vessel data processor 506 may be sent to risk analysis engine 608. Furthermore, vessel crime activity 428 may be sent to risk analysis engine 608.

At 610, one or more detected anomaly events and one or more anomaly histories may be received from the anomaly history 426 or 526a/526b. For the detected anomaly events and anomaly history, alarms may be determined. As discussed above, anomalies may be determined based on the parameter history and the associated profile. Anomalies may be determined if a vessel parameter deviates from its expected parameter for the segment, using the equation:

Expected anomaly=(2*Interquartile range(IQR)$^8$)+75th percentile

An alarm intensity may further be determined based on the determined anomalies, based on equation:

$$\text{Anomaly Intensity} = \frac{\text{Actual anomaly} - \text{Expected anomaly}}{\text{Expected anomaly}}$$

An alarm summary may be determined based on the equation:

Anomaly alarm summary=(previous anomaly alarm*0.75)+(current anomaly alarm*0.25)

For example, a speed alarm may be generated in real-time when real-time location data is received from a plurality of vessels if there are detected anomalies in a vessel's speed. When the reported speed of the vessel is above the maximum speed of the vessel profile then an alarm may be raised.

For the speed alarm, an alarm intensity may be calculated by using the equation:

$$\text{Speed Intensity} = \frac{\text{Actual speed} - \text{Expected speed}}{\text{Expected speed}}$$

The speed anomaly alarm intensity may be a value that ranges between 0 and 1. 0 means the vessel is traveling within its expected speed in that region and 1 means that the vessel is travelling at an unusually high speed when compared to its normal speed. By using the intensity of the speed alarm, it may be categorized into 5 different alarm values.

Finally, a speed alarm summary may be generated based on prior generated speed alarms using the equation Speed alarm summary=(previous speed alarm*0.75)+(current speed alarm*0.25)

At 612, vessel abnormal behavior clustering/aggregation is performed. This may involve clustering different types of anomaly events for a given vessel based on the anomaly history and the anomaly detection by the vessel data processor. The clustering may group the different vessel given their detected anomalies in order to identify similar behavior patterns in the different vessels. Clustering may identify vessels with similar vessel anomalies and may group them.

The vessel abnormal behavior clustering 612 may involve using centroid-based clustering, connectivity-based clustering, distribution-based clustering, or other clustering methods as are known.

At 614, the abnormal event behavior clustering information from 612, and the one or more alarms from 610 may be received, and a prediction may be made based upon a prediction model received from prediction model determination 616.

The prediction model may be a Naïve Bayesian model, a linear regression model, a multiple class classifier, or a Neural Network. The Neural Network may be a Recurrent Neural Network. Ensembles of models may be used, including two or more models. Where more than one model is used, an election may be performed of the candidate risk assessments from the two or more models to determine the risk assessment output 620.

The risk assessment output 620 may be a probability of a vessel being a risk. The probability may be mapped to a classification value, and a plurality of classification values may be used to describe a vessel's risk assessment. For example, a vessel may have a risk assessment selected from "very high", "high", "medium", "low", "none". Different classifications, and different classification scales may be used.

The vessel risk assessment 620 may be used for different purposes. The risk assessment may allow for simulation of a vessel's environment, route, or piloting decisions in order to identify risks. The vessel risk assessment 620 may be used in order to identify the likelihood of a vessel arriving on time according to a predetermined schedule. For example, the schedule may relate to contractual obligations including the vessel arriving at a destination by a certain time, scheduling of port resources such as cranes, scheduling of vessel or port personnel, and availability of equipment.

The risk assessment 620 may represent the likelihood of an risk activity (e.g., involvement in an incident, criminal activity) in the future.

At 616, a prediction model may be generated. The prediction model generation 616 may receive data 602 that includes historical data such as the vessel incident database 326 (see FIG. 3), the vessel database 332 (see FIG. 3), vessel tracking database 342 (see FIG. 3) and vessel crime activity database 348 (see FIG. 3). The model generation method is described in more detail in FIG. 10 and FIG. 12.

Figure 7:
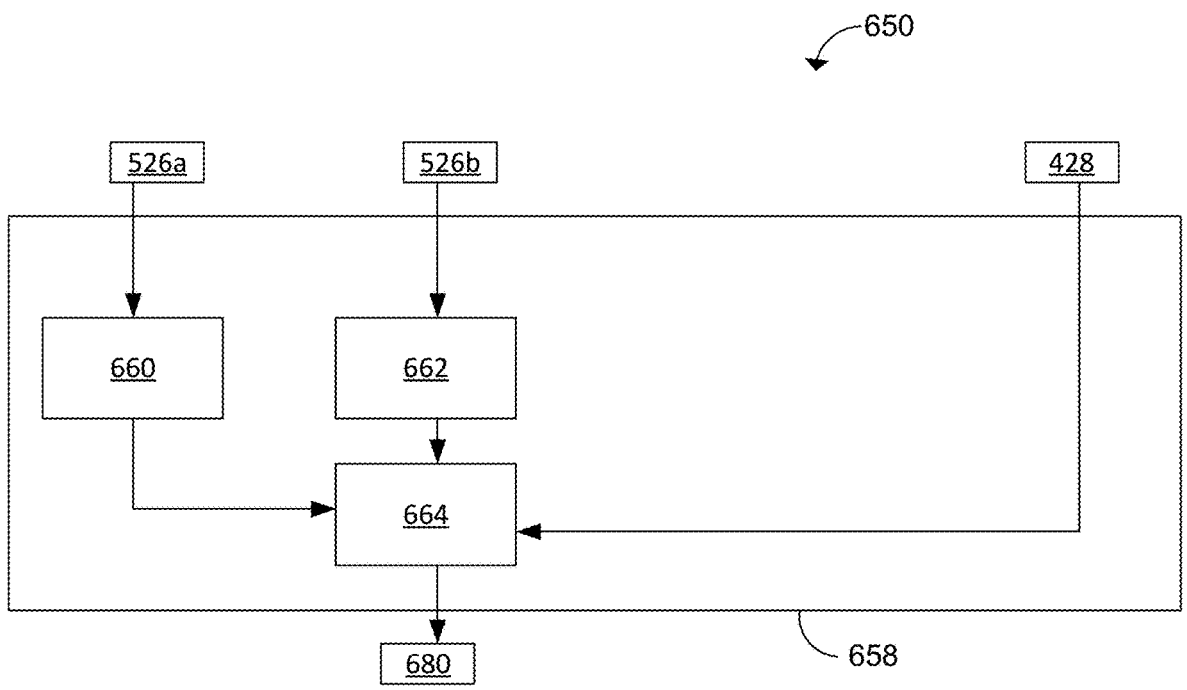
FIG. 7 shows an alternate method diagram of analyzing vessel risk in accordance with one or more embodiments.

Referring next to FIG. 7, there is an alternate method 650 of analyzing vessel risk in accordance with one or more embodiments. The risk analysis engine 658 may function differently than risk analysis engine 608 since the model generation 616 occurs elsewhere and the model is received by the risk analysis engine 658.

FIG. 7 may generally correspond to FIG. 6 in functionality. Specifically, alarm generation 660 corresponds to alarm generation 610, vessel anomaly clustering 662 corresponds to vessel anomaly clustering 612, risk assessment prediction 664 corresponds to risk assessment prediction 614. In FIG. 7 however, real-time predictions may be made based on a prediction model 664 that is generated separately and received at assessment prediction 664. Assessment prediction 664 may output a vessel assessment 680.

Figure 8:
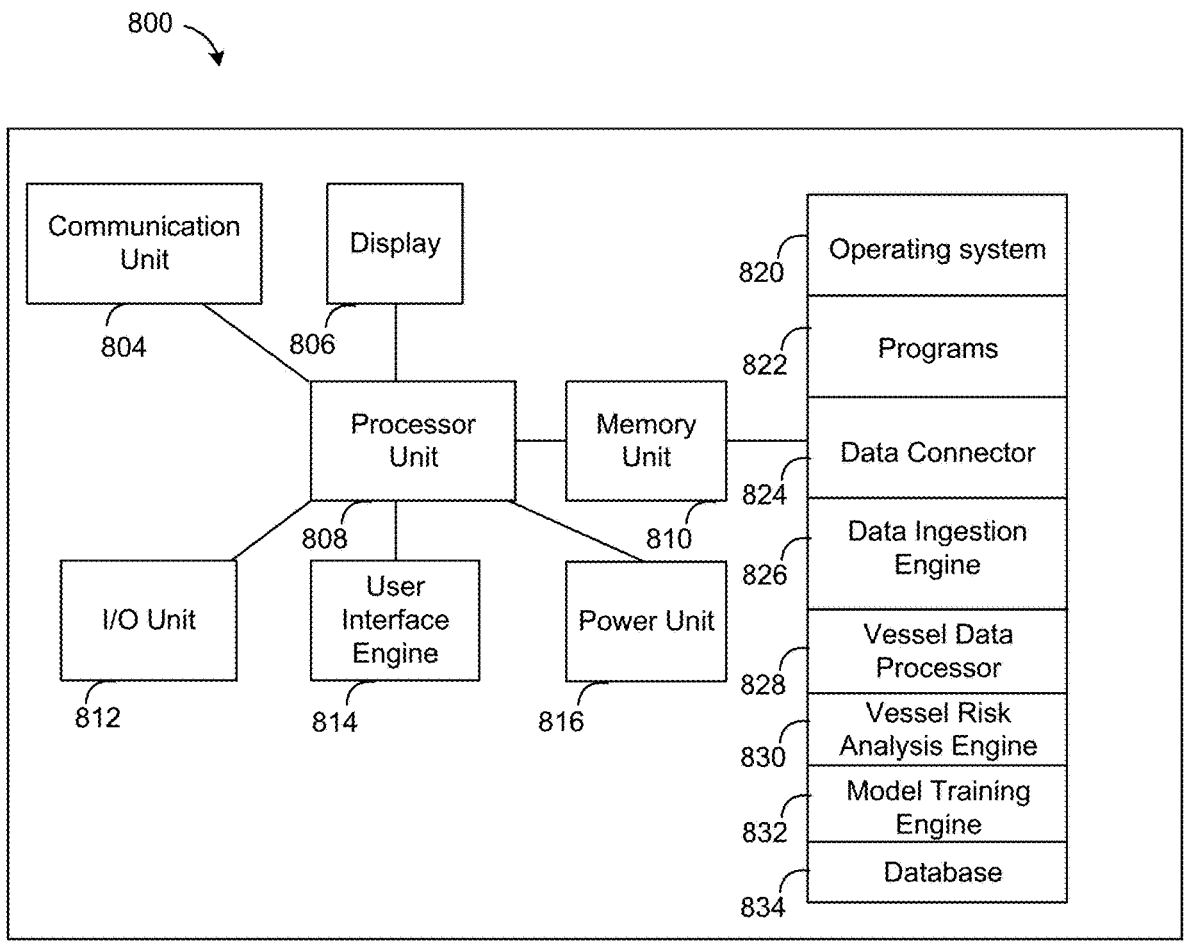
FIG. 8 shows a device diagram of a server in accordance with one or more embodiments.

Referring next to FIG. 8, a device 800 of a server is shown in accordance with one or more embodiments. The server 800 may be the server 108 of remote server 106 (see FIG. 1).

The server 800 has communication unit 804, display 806, I/O unit 812, processor unit 808, memory unit 810, user interface engine 814, and power unit 816. The memory unit 810 has operating system 820, programs 822, data connector 824, data ingestion engine 826, vessel data processor 828, vessel risk analysis engine 830, model training engine 832, and database 834. The processing server 800 may be a virtual server on a shared host, or may itself be a physical server.

The communication unit 804 may be a standard network adapter such as an Ethernet or 802.11x adapter. The processor unit 808 may include a standard processor, such as the Intel Xeon processor, for example. Alternatively, there may be a plurality of processors that are used by the processor unit 808 and may function in parallel. Alternatively, there may be a plurality of processors including a Central Processing Unit (CPU) and a Graphics Processing Unit (GPU). The GPU may be, for example, from the GeForce® family of GPUs from Nvidia®, or the Radeon® family of GPUs from AMD®. There may be a plurality of CPUs and a plurality of GPUs.

The processor unit 808 can also execute a user interface engine 814 that is used to generate various GUIs, some examples of which are shown and described herein, such as in FIGS. 17, 18, 19, and 20. The user interface engine 814 provides for vessel risk assessment layouts for users to configure, request, review, and respond to vessel risk assessments, and the information submitted using these interfaces may be processed by the data ingestion engine 826, vessel data processor 828, vessel risk analysis engine 830, model training engine 832, and database 834. User interface engine 814 may be provided as an Application Programming Interface (API) or a Web-based application that is accessible via the communication unit 804.

I/O unit 812 provides access to server devices including disks and peripherals. The I/O hardware provides local storage access to the programs running on processing server 800.

The power unit 816 provides power to the processing server 800.

Memory unit 810 may have an operating system 820, programs 822, data connector 824, data ingestion engine 826, vessel data processor 828, vessel risk analysis engine 830, model training engine 832, and database 834.

The operating system 820 may be a Microsoft Windows Server® operating system, or a Linux-based operating system, or another operating system.

The programs 822 comprise program code that, when executed, configures the processor unit 808 to operate in a particular manner to implement various functions and tools for the processing server 800.

Data connector 824 may provide for integration, either push or pull with one or more vessel tracking provider servers 112 (see FIG. 1), and one or more 3$^{rd}$ party data providers (such as vessel data or vessel information providers, one or more mapping providers, one or more regional boundary providers, one or more vessel incident providers, and one or more crime-related activity providers, see 210 in FIG. 2). The integration may be an API integration as known, for example using an XML based REST API. The data connector 824 may transmit and receive requests and responses to the one or more vessel tracking provider servers and the one or more 3$^{rd}$ party data providers using the communication unit 804.

Data ingestion engine 826 may receive data from the data connector 824, and may ingest and pre-process data from the one or more vessel tracking provider servers and the one or more 3rd party data providers, as described in FIG. 3. The ingested data may be stored in database 834, and processed by vessel data processor 828.

Vessel data processor 828 may receive data from the data ingestion engine 826 and from the database 834, and may determine one or more parameters for a segment of vessel data, determine one or more profiles of the parameters of vessel data, and then may determine one or more vessel anomaly events as described in FIG. 4 and FIG. 5. The vessel data processor 828 may send the determined parameters, the vessel profiles, and the anomaly events to the vessel risk analysis engine 830, and may store them in the database 834.

Vessel risk analysis engine 830 may receive data from the data ingestion engine 826, the vessel data processor 828, either directly or by querying database 834 as described in FIG. 7. The vessel risk analysis engine 830 may store one or more prediction models in memory, and may use the prediction models in order to create and output a risk assessment of a vessel.

Figure 10:
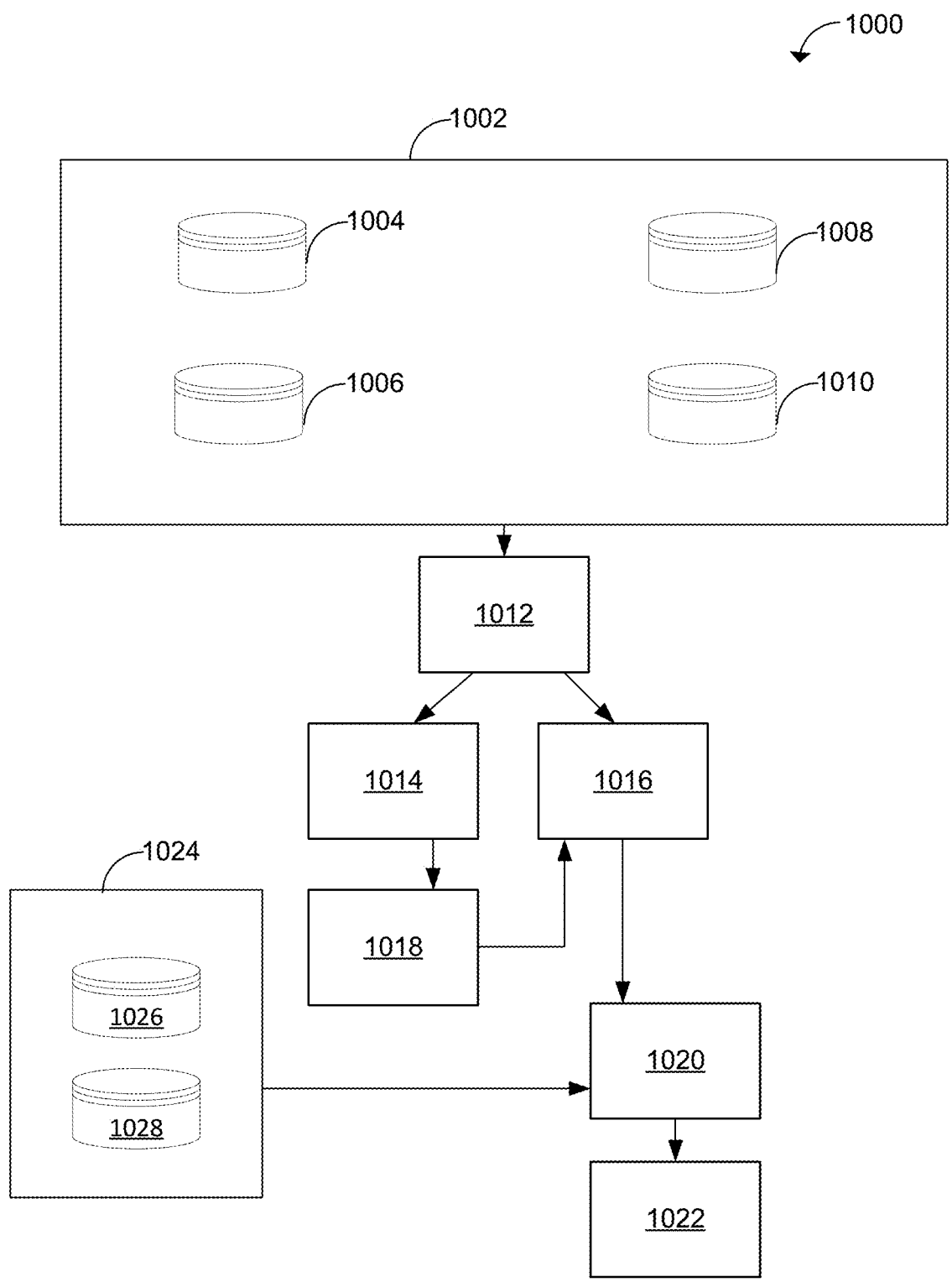
FIG. 10 shows a system diagram for generating one or more models for vessel risk assessment in accordance with one or more embodiments.
Figure 12:
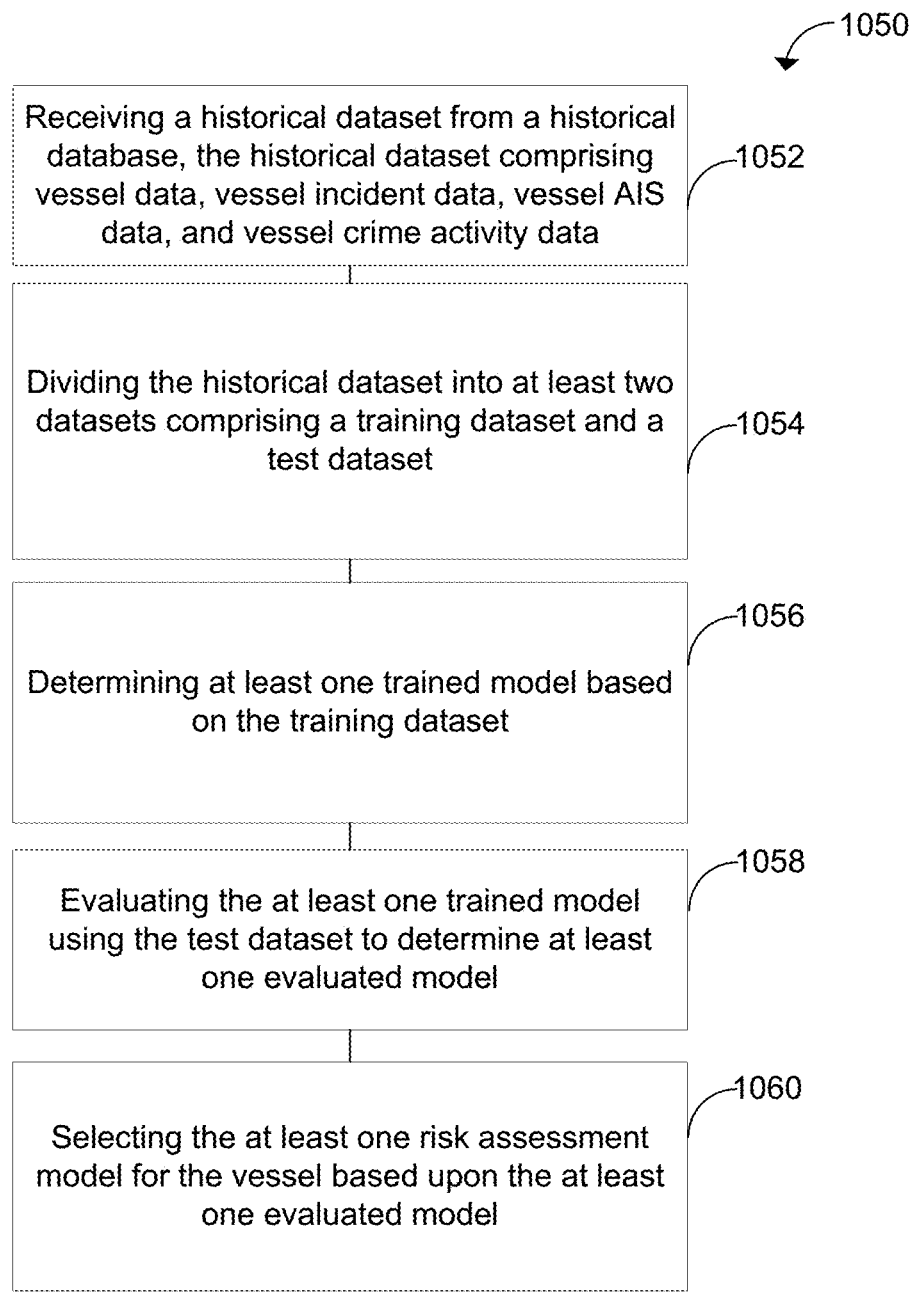
FIG. 12 shows a method diagram for generating one or more prediction models in accordance with one or more embodiments.

Model training engine 832 may generate one or more prediction models as described in FIGS. 6, 10 and 12. The models may be stored in memory, or may be stored in database 834.

Optionally, database 834 may be hosted by server 800. The database may correspond to the database 110 (see FIG. 1). In an alternate embodiment, the database may run on a separate server from the server 800 and may be available via communication unit 804.

Figure 9:
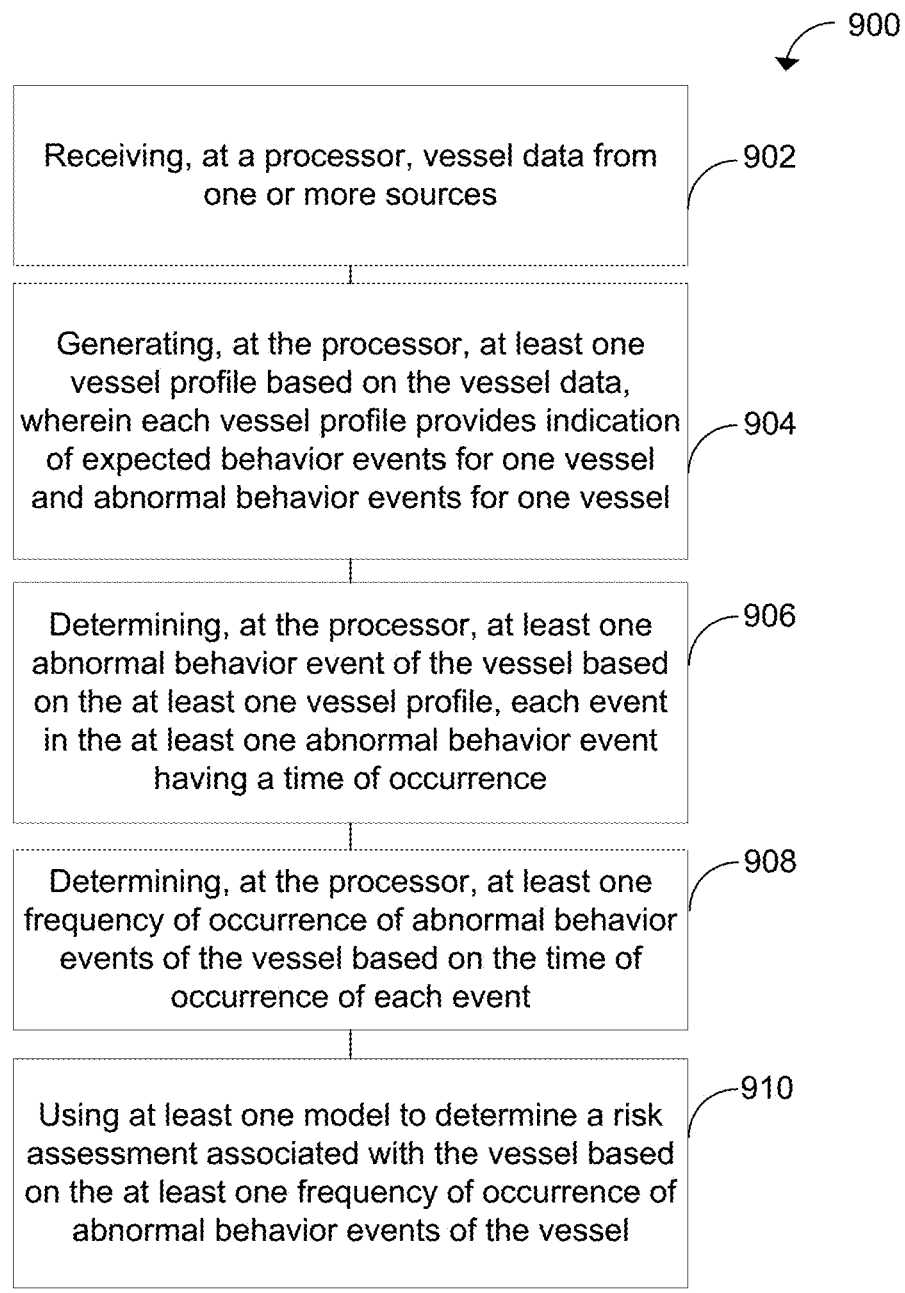
FIG. 9 shows a method diagram for determining a vessel risk assessment in accordance with one or more embodiments.

Referring next to FIG. 9, there is a method 900 for determining a vessel risk assessment in accordance with one or more embodiments.

At 902, receiving, at a processor, vessel data from one or more sources. As described above, this may include data from one or more vessel tracking providers and data from one or more 3rd party data providers.

In an exemplary embodiment, the vessel data includes AIS data about one or more vessels. The AIS data may be enhanced with region boundaries.

At 904, generating, at the processor, at least one vessel profile based on the vessel data, wherein each vessel profile provides indication of expected behavior events for one vessel and abnormal behavior events for one vessel.

At 906, determining, at the processor, at least one abnormal behavior event of the vessel based on the at least one vessel profile, each event in the at least one abnormal behavior event having a time of occurrence.

At 908, determining, at the processor, at least one frequency of occurrence of abnormal behavior events of the vessel based on the time of occurrence of each event.

At 910, using at least one model to determine a risk assessment associated with the vessel based on the at least one frequency of occurrence of abnormal behavior events of the vessel.

Optionally, the at least one source may include at least one selected from the group of a vessel incidents information source, a vessel information source, a vessel tracking data source, a regional boundaries source, and a crime-related activity source. The at least one source may be a data provider as described in FIG. 1.

Optionally, the method may further comprise: determining, at the processor, enhanced vessel tracking data based on the vessel data; and tagging the enhanced vessel tracking data based on vessel identification.

Optionally, the determining the enhanced vessel tracking data may comprise merging the vessel data with region boundary data.

Optionally, the at least one vessel profile may comprise statistical information for a first vessel for a first geographical region and wherein the determination of a first abnormal event of the first vessel for the first geographical region may be based on the statistical information.

Optionally, an alarm may be generated based on the determination of the first abnormal event. The alarm may be generated by the risk analysis engine as described in FIGS. 6 and 7.

Optionally, the at least one abnormal behavior event may be determined based on the at least one vessel profile and a behavior data of the vessel for at least one route segment in the first geographical region. Optionally, different profiles may be determined for a vessel for corresponding different geographical regions.

Optionally, the method may further comprise determining a cluster of anomalies in the at least one anomaly. The determining the cluster of anomalies may occur at the risk analysis engine as described in FIGS. 6 and 7.

Optionally, the determining the risk assessment may comprise performing outlier detection based on the at least one abnormal behavior event and the at least one frequency of abnormal behavior.

Optionally, the at least one model may be selected from the group of a Naïve Bayesian model, a linear regression model, a multiple class classifier, and a Neural Network.

Optionally, the Neural Network may be a Recurrent Neural Network.

Optionally: the at least one model may comprise two or more models; and the determining the risk assessment associated with the vessel may comprise: determining a candidate risk assessment for each of the two or more models; and performing an election of the candidate risk assessments from the two or more models to determine the risk assessment.

Optionally, the at least one model may be determined for a single vessel.

Optionally, the at least one vessel profile may include at least one selected from the group of a vessel MMSI profile, a vessel name profile, a vessel destination profile, a vessel visit duration profile, a vessel trip duration profile, a vessel movement profile, a vessel speed profile, a vessel tracking transmission profile, a vessel tracking position accordance profile, a vessel sea route profile, a vessel crew size profile, a vessel incident profile and a vessel rendezvous profile.

Optionally, the detected at least one anomaly may include at least one selected from the group of a speed anomaly, a location anomaly, a vessel tracking transmission anomaly, and a rendezvous anomaly.

Referring next to FIG. 10, there is a system 1000 for generating one or more models for vessel risk assessment in accordance with one or more embodiments. The system 1000 may run on server 108 (see FIG. 1). The system 1000 include historical datasets 1002 (for example, from database 110 in FIG. 1) including vessel information dataset 1004, vessel tracking dataset 1006, vessel incident dataset 1008, and vessel crime activity dataset 1010. For model training, the vessel information dataset 1004 and the vessel tracking dataset 1006 may be used as inputs and the vessel incident dataset 1008 and the vessel crime activity dataset 1010 may be used as labels. Further, the method for determining anomalies may be performed according to FIGS. 4 and 5 in order to identify anomalies as input.

The division of datasets 1012 may including dividing 80% of the dataset into a training dataset and 20% into the testing dataset.

The system 1000 further includes dividing the dataset 1012 into a testing dataset and a training dataset. The training dataset is used at model training 1014 to generate one or more trained models 1018. The model generation may use an iterative process such as gradient descent in order to determine a set of coefficients or weights for the model. Other model training algorithms may be used as are known.

The model training 1014 may further receive user feedback data from the user interface that corresponds to prior model predictions for vessel risk assessments. The user feedback data may be stored in database 110 (see FIG. 1). This may include a variety of different types of user data, including true/false inputs, a selected grade by the user of the assessment, text input describing potential issues, etc. The model training 1014 may incorporate the user feedback with a supervised learning method (as are known) in order to improve the accuracy of model predictions for vessel risk assessment.

For example, supervised learning may be used and feedback may be incorporated that has been provided by a user. The user data may be stored in a supervised learning dataset (example set). The user data may be used to re-train the model (using the supervised learning dataset as a data sample). The increased number of data samples may improve the prediction accuracy of the model. Once the model is trained, a model evaluation may be performed to evaluate whether the model have improved prediction due to the supervised learning data.

The one or more trained models 1018 may be evaluated using the testing dataset at model evaluation 1016. The evaluation may determine predictions using the testing portions of the vessel information dataset 1004 and the vessel tracking dataset 1006, and compare the assessments determined by the prediction model against the labels in the testing portion of the vessel incident dataset 1008 and the vessel crime activity dataset 1010. Based on the model evaluation 1016, one or more data models may be selected from the set of generated models.

The trained and evaluated models selected during model evaluation 1016 may be used in order to generate real-time vessel assessment predictions 1022 based on incoming real-time data 1024 including incoming vessel information data 1026 and incoming vessel tracking data 1028.

The vessel assessment predictions 1022 may be output to a user in accordance with the user interfaces provided herein, or stored in the database 110 (see FIG. 1).

Figure 11:
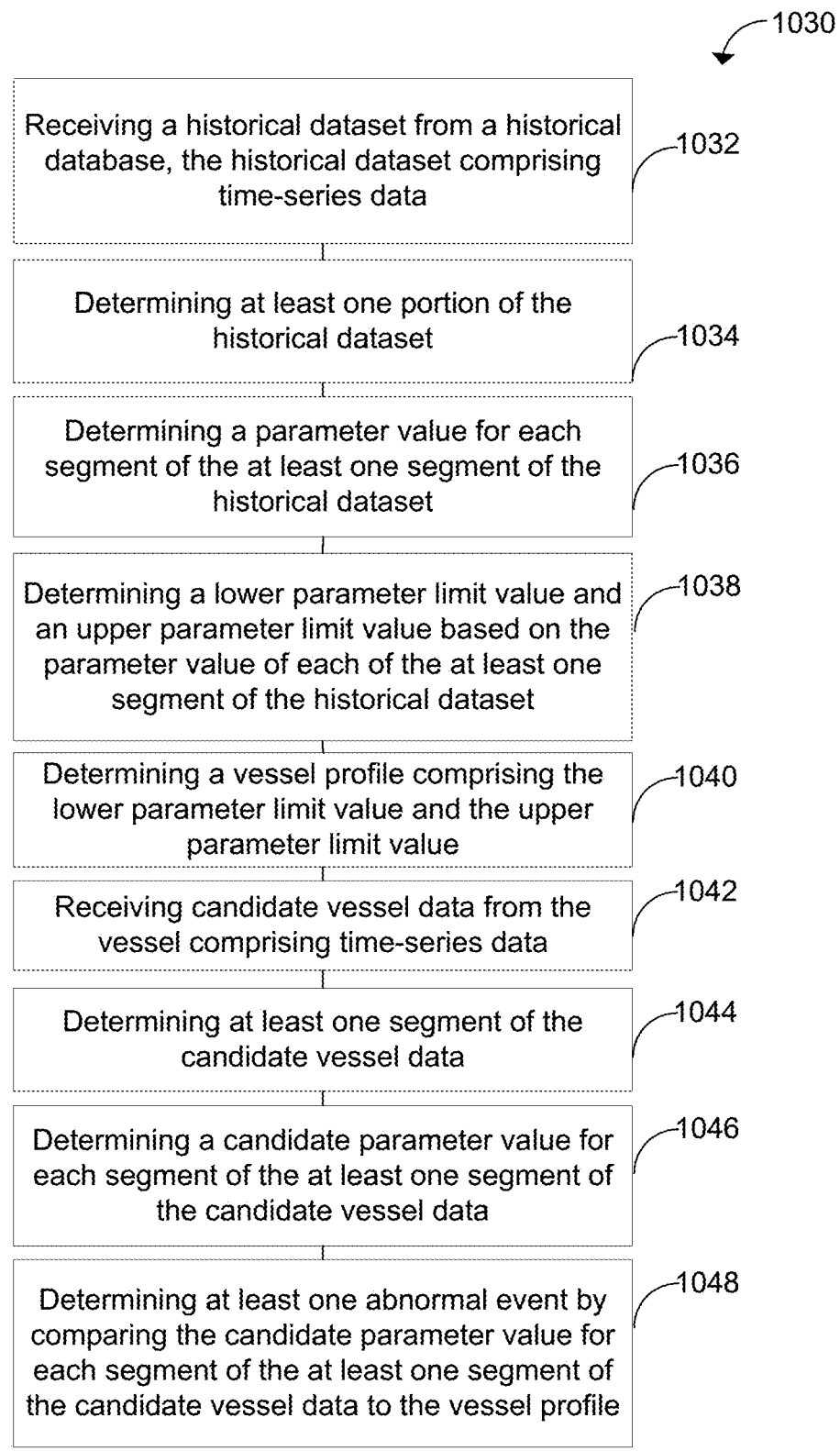
FIG. 11 shows a method diagram for determining one or more vessel profiles in accordance with one or more embodiments.

Referring next to FIG. 11, there is a method 1030 for determining one or more vessel profiles in accordance with one or more embodiments.

At 1032, receiving a historical dataset from a historical database, the historical dataset comprising time-series data. The historical dataset may include at least one selected from the group vessel tracking data, region boundary data, vessel information data, vessel incident data, and vessel crime activity data.

At 1034, determining at least one segment of the historical dataset. As described above, the at least one vessel segment may be split based on time intervals, or another method.

At 1036, determining a parameter value for each segment of the at least one segment of the historical dataset. This may include an MMSI parameter (or MMSI name change parameter), a vessel name parameter (or vessel name change parameter), a port visit parameter (including destination and visit duration), trip parameters, trip stop/go parameters, trip speed parameters, trip vessel tracking parameters, vessel tracking accordance parameters, sea route parameters, crew size parameters, vessel incident parameters, and vessel rendezvous parameters.

At 1038, determining a lower parameter limit value and an upper parameter limit value based on the parameter value of each of the at least one segment of the historical dataset.

At 1040, determining a vessel profile comprising the lower parameter limit value and the upper parameter limit value.

At 1042, receiving candidate vessel data from the vessel comprising time-series data. The candidate vessel data may be real-time data that is received generally in real time from a vessel tracking provider.

At 1044, determining at least one segment of the candidate vessel data.

At 1046, determining a candidate parameter value for each segment of the at least one segment of the candidate vessel data. The candidate parameter value may be one of the types of the parameter value determined in 1036.

At 1048, determining at least one abnormal event by comparing the candidate parameter value for each segment of the at least one segment of the candidate vessel data to the vessel profile.

Optionally, the determining the lower parameter limit value and the upper parameter limit value may further comprise determining the lower parameter limit value and the upper parameter limit value based on at least one of a historical parameter value determined for a geographic region and a historical parameter value determined for a time-of-year.

Optionally, the method may further comprise determining an interquartile range based on the parameter value of each of the at least one segment of the historical dataset; and wherein the vessel profile may further comprise the interquartile range.

Optionally, the determining the interquartile range may further comprise determining the interquartile range based on at least one of a historical parameter value determined for a geographic region and a historical parameter value determined for a time-of-year.

Optionally, the historical dataset may comprise at least one selected from the group of: a vessel MMSI dataset, a vessel name dataset, a port visit dataset, a vessel trip history dataset, a vessel trip movement dataset, a vessel trip speed dataset, a vessel tracking transmission dataset, a vessel trip position accordance dataset, a vessel sea route dataset, a vessel crew size dataset, a vessel incident dataset, and a vessel rendezvous dataset.

Referring next to FIG. 12, there is a method 1050 for generating one or more prediction models in accordance with one or more embodiments. The method 1050 may be provided as part of the system described in FIG. 10.

At 1052, receiving a historical dataset from a historical database, the historical dataset comprising: vessel data, vessel incident data, vessel anomaly data, and vessel crime activity data. The historical dataset may be stored in database 110 (see FIG. 1), and may be provided by the one or more data providers.

At 1054, dividing the historical dataset into at least two datasets comprising a training dataset and a test dataset.

At 1056, determining at least one trained model based on the training dataset.

At 1058, evaluating the at least one trained model using the test dataset to determine at least one evaluated model.

At 1060, selecting the at least one risk assessment model for the vessel based upon the at least one evaluated model.

Optionally, the determining the at least one trained model may comprise: determining a plurality of vessel segments based on the historical dataset, wherein each vessel segment comprises a corresponding vessel data segment, a corresponding vessel incident data segment, a corresponding vessel anomaly segment, and a corresponding vessel crime segment; performing supervised model training using the plurality of vessel segments, wherein for each segment the vessel data segment and the vessel anomaly segment are inputs, and the vessel incident data and the vessel crime data are corresponding labels for the inputs.

Optionally, each of the at least one trained model may be selected from the group of a Naïve Bayesian model, a linear regression model, a multiple class classifier, and a Neural Network; each of the at least one evaluated model may be selected from the group of a Naïve Bayesian model, a linear regression model, a multiple class classifier, and a Neural Network; each of the at least one risk assessment model may be selected from the group of a Naïve Bayesian model, a linear regression model, a multiple class classifier, and a Neural Network.

Optionally, the Neural Network may be a Recurrent Neural Network.

Optionally, the method may further comprise receiving a user feedback request from a user device, the user feedback request comprising a feedback value and a corresponding identifier; and wherein the determining the at least one trained model may be further based on the feedback value and the corresponding identifier.

Figure 13:
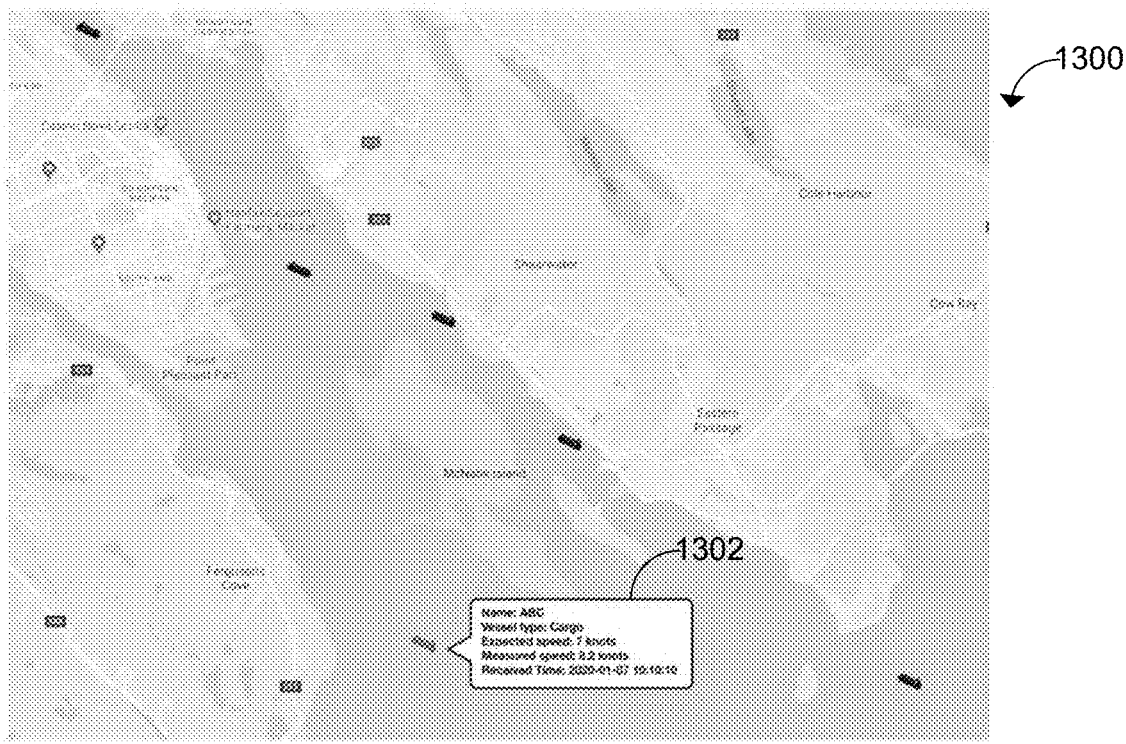
FIG. 13 shows another anomaly detection diagram in accordance with one or more embodiments.

Referring next to FIG. 13, there is an anomaly detection diagram 1300 in accordance with one or more embodiments. To learn the normal behavior of each vessel, a collection of trajectories (and other information) may be used from a historical dataset for the purposes of determining one or more vessel profiles. For generating the profile for each vessel, the historical messages or trajectory of the vessels may be received and segmented into individual trips (port to port), and may be further segmented into portions of an individual trip. The segmentation may assist in understanding the profile of a vessel in various parts of the ocean, for example near ports or in middle of the ocean as speed may vary between these different types of segment locations. The individual segments may involve determining parameters between a start point of the segment and an end point of the segment known as parameters that include distance travelled, speed, acceleration, jerk, bearing, and bearing rate.

As shown, a vessel anomaly 1302 may be determined for a vessel where the measured speed exceeds a lower or upper speed limit (or quartile values). Vessel information may be provided, along with an expected speed of 7 knots and a measured speed of 8.2 knots.

Figure 14:
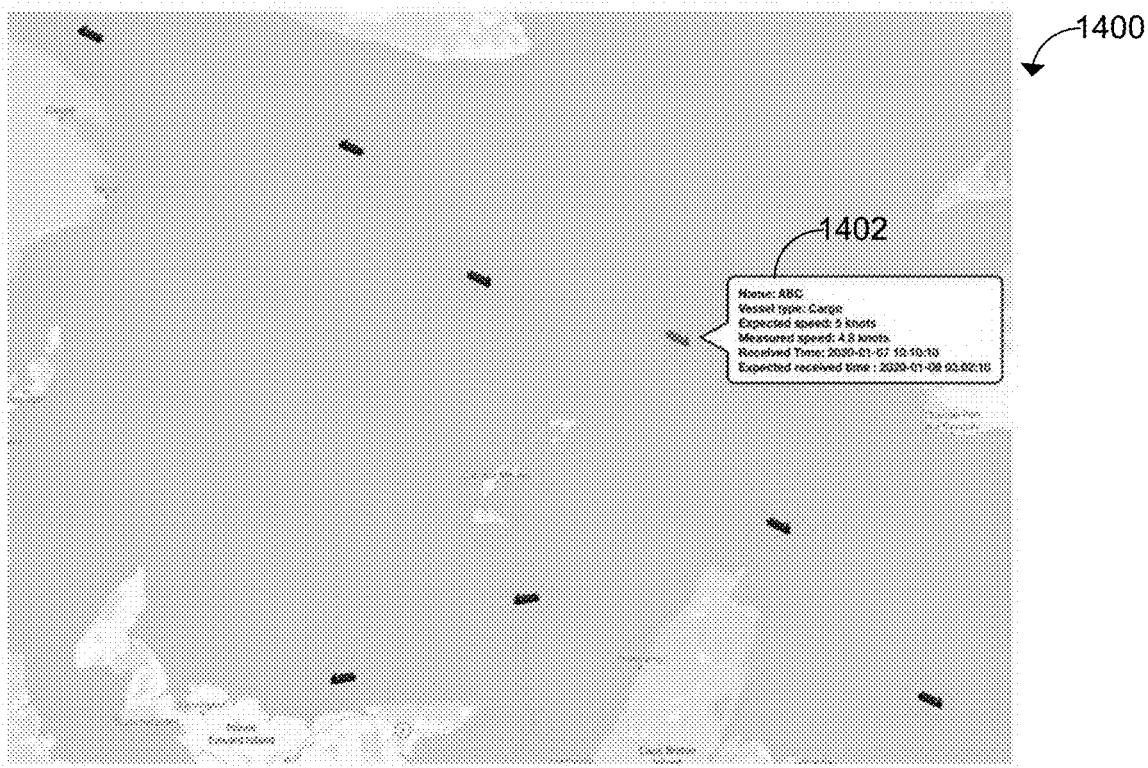
FIG. 14 shows another anomaly detection diagram in accordance with one or more embodiments.

Referring next to FIG. 14, there is another anomaly detection diagram 1400 in accordance with one or more embodiments. The vessel tracking transmission anomaly identification may check if the reporting of vessel tracking messages of a vessel deviates from the expected value.

At 1402, a vessel tracking transmission time for a segment is shown "2020-01-07 10:10:10", and an expected received time is also displayed "2020-01-08 03:02:10".

In an exemplary embodiment, the vessel tracking messages are AIS messages.

The vessel tracking transmission rate anomaly identification checks the frequency rate between the messages sent by a vessel and may raise an alarm if a vessel deviates from its expected frequency. For generating the profile for each vessel, the historical messages of the vessels are taken and segmented into individual trips (port to port), and may be segmented further into portions of an individual trip. The segmentation may assist in understanding the rate at which a vessel sends a message when it is in different geographical regions. There may be different transmission rate standards that are set up by different national and international authorities. The segmentation of the one or more segments may be based on when the vessel is at sea, in a port region, or a particular marine region at which the vessel was when vessel tracking messages were sent. The parameters may be generated by using the time difference, distance and speed between the transmission of messages of each segment The vessel tracking transmission rate profile of the vessel may include three parts:

Vessel Transmission Profile: This part of the profile may represent the rate at which the vessel transmits a vessel tracking message regardless where of its geographic location or region.

Region Transmission Profile: This part of the profile may give the rate at which all vessels transmit vessel tracking messages while in a particular marine region. The protocol for vessel tracking message transmission (including AIS transmissions) may vary depending on the marine region.

Vessel Region Transmission Profile: This part of the profile may give the rate at which a particular vessel transmits when in a particular marine region.

The parameters may be determined for the one or more segments and may be used to generate a vessel tracking transmission profile for the vessel. A summary may be determined based on the aggregation of the parameters that include the maximum, minimum, mean, median, standard deviation, and the 10th, 25th, 75th and 90th percentiles for each vessel, each marine region and vessel in a marine region.

Referring next to FIG. 15, vessel tracking data enhancement is shown in accordance with one or more embodiments, for example see 408 (see FIG. 4) and 508 (see FIG. 5).

The positional data of the vessel tracking messages may be spatially joined with different geometric location of ports, marine regions, and Exclusive Economic Zones (EEZ) encoded in shapefiles. A shapefile may be a simple, nontopological format for storing the geometric location and attribute information of geographic features. Geographic features in a shapefile may be represented by points, lines, or polygons (areas).

The marine region and EEZ shapefiles may be similar to those produced by Flander Marine Institute, which maintains a database of international borders in open waters. The EEZ may be modified or adjusted in order to improve data processing performance by reducing the size of the shapefile. This may be achieved by generating a one-way buffer in land for the EEZ. This may simplify the geometry around the coastline and allow for joining of vessel tracking messages that may be immediately at the land boundary. The buffering may also prevent an increase in the extent of a countries EEZ.

The port shapefiles may be generated using a tool, for example the World Port Index ports. The ports may be converted into points and may be buffered to generate port zone shapefiles.

The join operator between the shapefiles and vessel tracking positions may output the corresponding location identification on which each vessel tracking message is reported in. This information may be used for selecting region or geographically specific analysis (including determination of geographically specific profile data).

The vessel tracking data may join a region identifier (Region ID) and a Port identifier (Port ID) to one or more segments of vessel tracking data.

At 1502, a trip for a first vessel is displayed, including one or more segments. On the open ocean, the vessel tracking data is enhanced to join a region identifier (0) and port identifier (0). A region ID and a port ID of 0 may identify that the associated vessel tracking data is not associated with a particular region or port respectively. As the vessel proceeds from the ocean into the marine region defined off the coast of Nova Scotia, Canada, the vessel tracking data may be enhanced to indicate that the vessel has entered the Canadian marine region (Region ID 8493, Port ID 0). Finally, as the vessel arrives at the port of Saint John, New Brunswick, the vessel tracking data may be enhanced to indicate that it has entered the port (Region ID 8493, Port ID 6550).

At 1504, a trip for second vessel is displayed, including one or more segments. As the vessel exits the St. Lawrence river into the Gulf of St. Lawrence, its vessel tracking data may be enhanced (Region ID 8493, Port ID 0). As the vessel passes through the marine boundary of the French territory of Saint Pierre and Miquelon, its vessel tracking data may be enhanced (Region ID 8494, Port ID 0), and once it leaves, the vessel tracking data may be enhanced again back to the Canadian marine region (Region ID 8494, Port ID 0).

Figure 16:
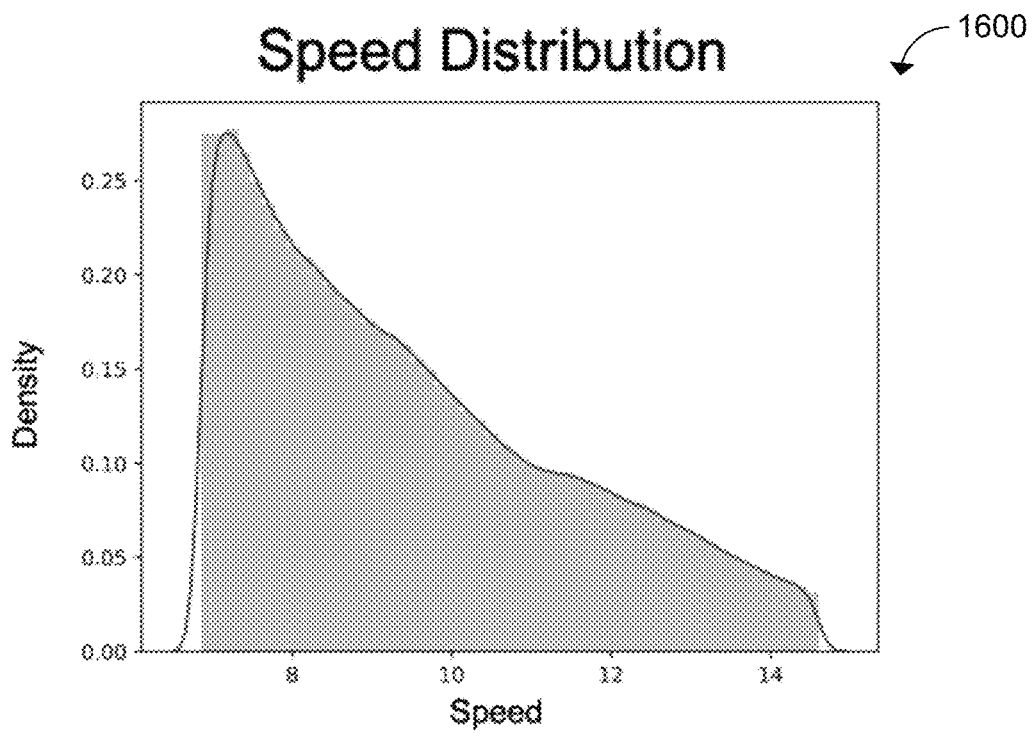
FIG. 16 shows a speed distribution diagram in accordance with one or more embodiments.

Referring next to FIG. 16 a speed distribution diagram 1600 is shown in accordance with one or more embodiments. A vessel profile, as described above, may include distribution information for a parameter of a vessel. The distribution information may be provided in a vessel profile in order to determine anomaly events in one or more segments of vessel tracking data. As shown in distribution diagram 1600, a vessel speed distribution may show the density of speed parameter values for a vessel over a variety of different speeds, as generally indicated between 6 and 14 knots.

Figure 17:
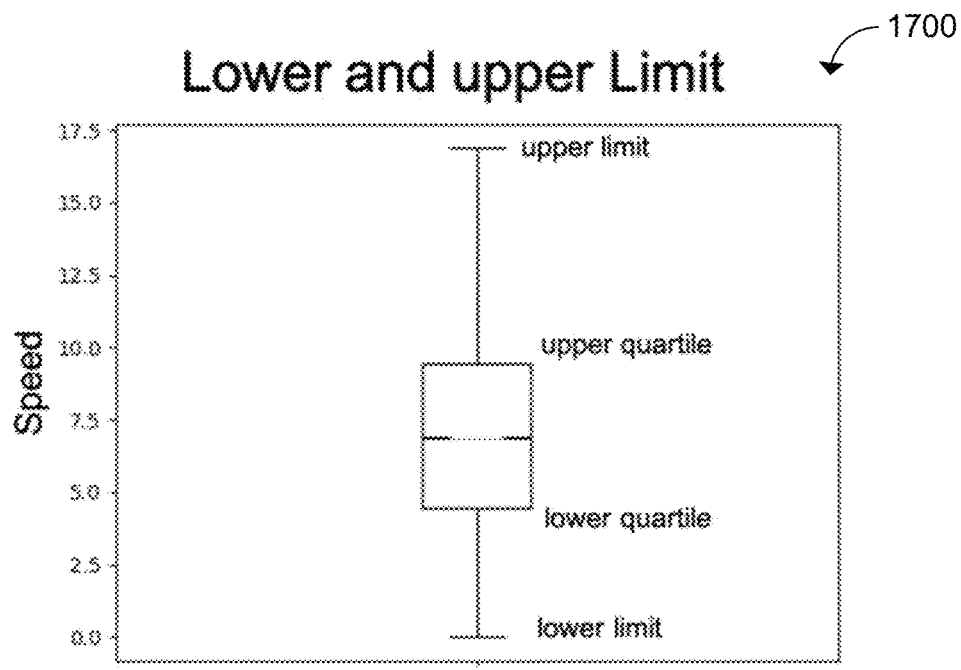
FIG. 17 shows an upper and lower limit diagram in accordance with one or more embodiments.

FIG. 17 shows an upper and lower limit diagram 1700 in accordance with one or more embodiments. Based on the parameter distribution (for example, the speed distribution shown in FIG. 16) a vessel profile may be determined that includes a lower parameter limit value, and an upper parameter limit value. Further, an upper quartile parameter value and a lower quartile parameter value may be determined for a vessel profile. In the example shown in FIG. 17, features of a vessel speed profile may be shown including an upper parameter limit of 17.0, and a lower parameter limit of 0. A vessel speed anomaly may be determined based on the vessel speed profile defined by the lower limit and the upper limit where a candidate (real-time) segment has a vessel speed above the upper limit or below the lower limit.

The example in FIG. 17 further shows an average parameter of 7.4, an upper quartile limit of 9.5, and a lower quartile limit of 4.5. A vessel speed anomaly may be determined based on the vessel speed profile defined by the lower quartile limit and the upper quartile limit where a candidate (real-time) segment has a vessel speed above the upper quartile limit or below the lower quartile limit.

In an alternate embodiment, anomaly events may be determined for a vessel profile having an upper parameter limit, a lower parameter limit, an upper quartile limit, and a lower quartile limit. The anomaly events in this case may have different types, for example no anomaly event when the candidate parameter is between the upper and lower quartiles, a first type where the candidate parameter is between the upper quartile limit and the upper limit, a second type where the candidate parameter is between the lower quartile limit and the lower limit, a third type where the candidate parameter is above the upper limit, and a fourth type where the candidate parameter is below the lower limit.

Figure 18:
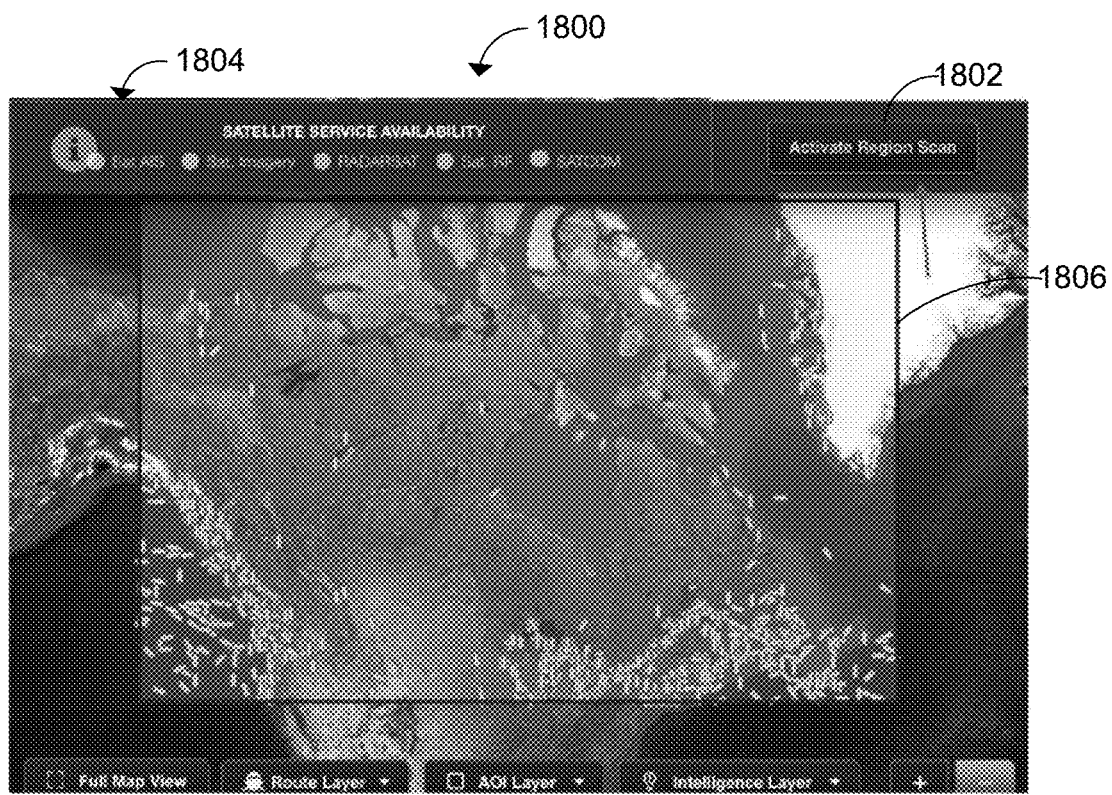
FIG. 18 shows a user interface diagram in accordance with one or more embodiments.

Referring next to FIG. 18, there is shown a user interface diagram 1800 in accordance with one or more embodiments. The user interface 1800 may be generated by the user interface engine 814 (see FIG. 8) and may be provided to an end user by way of a downloaded app on their user device in communication with server 108 (see FIG. 1), or by way of a web interface provided by server 108 (see FIG. 1).

The user interface 1800 may show a map including one or more maritime regions, EEZs or ports and one or more vessels. Communication status 1804 with one or more data providers may be displayed. The user may proceed by selecting the "Activate Region Scan" button 1802 which may begin vessel risk assessment of the one or more vessels.

The user interface 1800 may include a selectable box 1806 that may enable a user to select on the map a particular region or regions for the region scan when the activate region scan button 1802 is selected.

Figure 19:
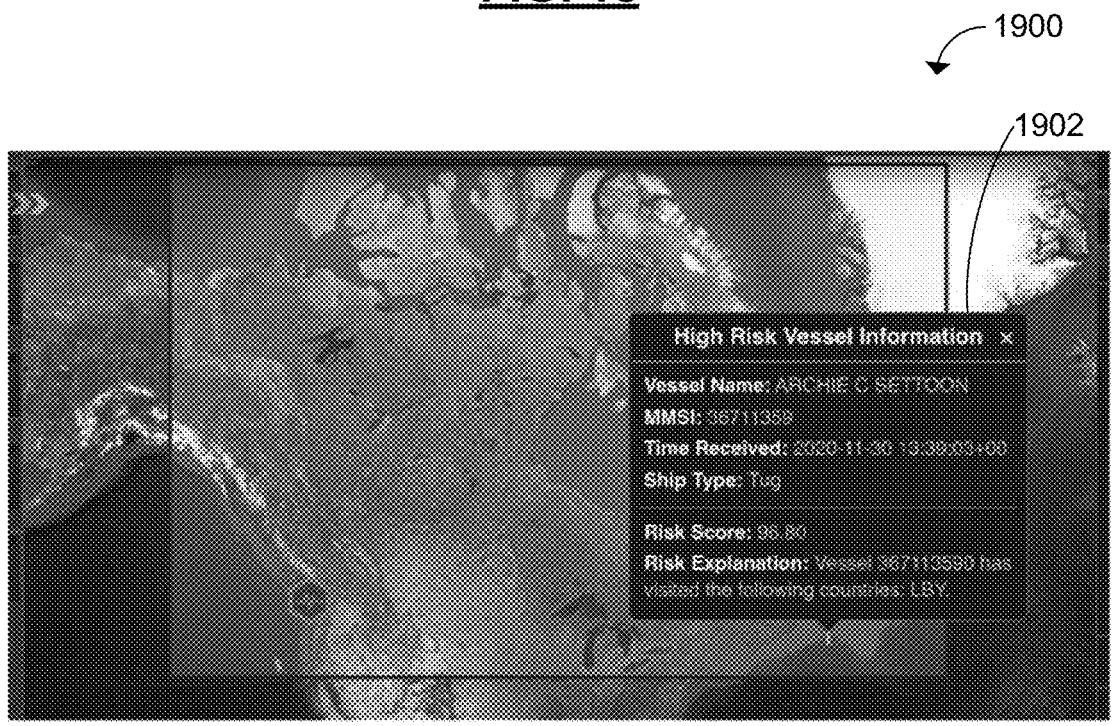
FIG. 19 shows another user interface diagram in accordance with one or more embodiments.

Referring next to FIG. 19, there is shown another user interface diagram 1900 in accordance with one or more embodiments. Responsive to the user's selection of the "Activate Region Scan" button 1802, risk assessments may be performed on the one or more vessels in the selected marine region. The user interface 1900 may display any vessels in the one or more vessels having significant risk classification. The user may select a vessel, and may be presented with an assessment window 1902 summarizing the reasons for the risk assessment of the vessel and corresponding risk assessment information.

For example, in the assessment window 1902 as shown, a vessel name, MMSI, vessel tracking message timestamp, ship type, risk score, and risk explanation. The assessment window may show information related to the vessel tracking data, determined vessel profile information, vessel incident information, vessel information, and vessel criminal activity.

The risk score may be a determined confidence value of the vessel risk assessment, or a score related to the overall risk score determined based on the model prediction (see FIGS. 6 and 7).

The risk explanation may show a rationale for the risk score, or one or more significant contributing parameters to the score. In this example, the risk score is 96, and the explanation is that the vessel has recently visited Libya, which may be considered a port visit anomaly.

Figure 20:
FIG. 20 shows another user interface diagram in accordance with one or more embodiments.

Referring next to FIG. 20, there is shown another user interface diagram 2000 in accordance with one or more embodiments.

The user interface diagram 2000 may be displayed when the user selects the high risk vessel displayed in assessment window 1902 (see FIG. 19). In response to the selection, additional summary information may be displayed in a details window 2002.

The details window 2002 may show a summary of the data associated with the vessel identified in assessment window 1902, other vessels (for example, other vessels of the same type as the vessel identified in assessment window 1902), and notes information.

The user may select the "Vessel Note" button 2004 in order to create, edit, or remove the entries under the Vessel Notes section of the details window 2002.

Figure 21:
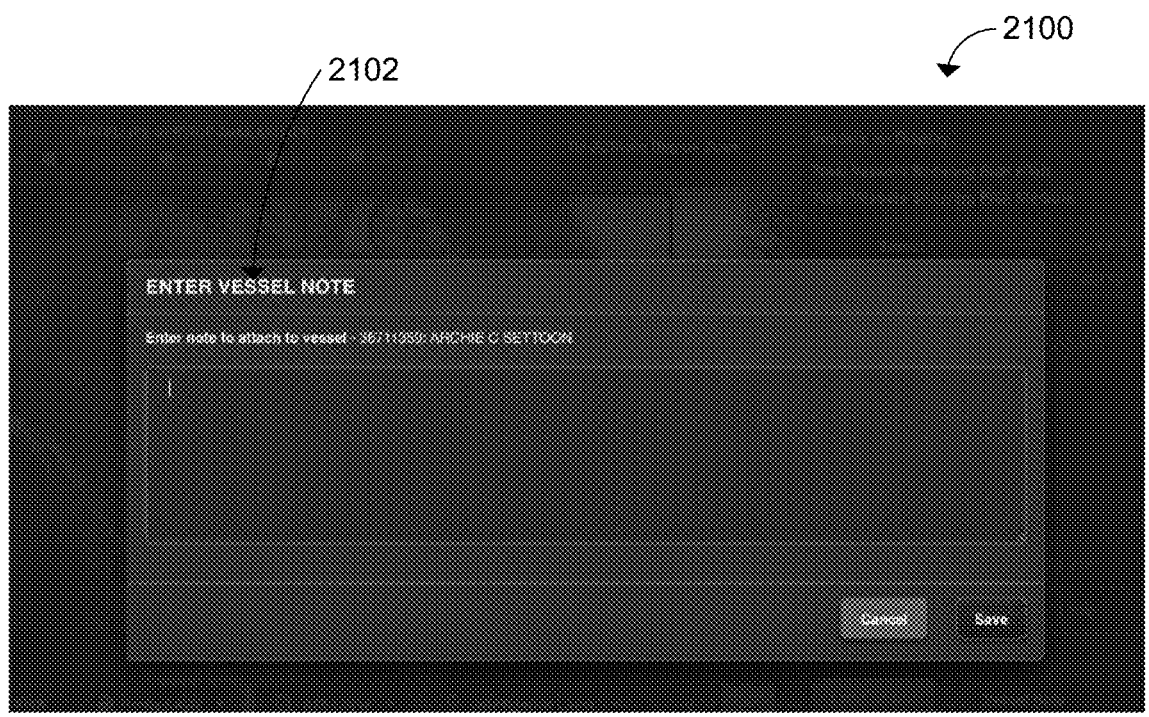
FIG. 21 shows another user interface diagram in accordance with one or more embodiments.

Referring next to FIG. 21, there is shown another user interface diagram 2100 in accordance with one or more embodiments.

Responsive to the user's selection of the "Vessel Note" button 2004, a Vessel Note window 2102 may be displayed. The vessel note window may allow for a variety of different user inputs with respect to the vessel risk assessment of the vessel shown in assessment window 1902. While a text box is shown in note window 2102, it is understood that a variety of user input types may be submitted by the user. This may allow a user to review the details of a vessel risk assessment, and then submit feedback to the server 108 (see FIG. 1) that may be used by the model training method (see FIGS. 10 and 12) as further input. In this manner, the user interface may allow for user feedback on vessel assessments that may be used for supervised learning, and may be used during model training in order to improve the accuracy of the vessel risk assessments by the prediction model. The feedback data corresponding to the risk assessment may be received by server 108, and stored in database 110 (see FIG. 1).

The present invention has been described here by way of example only. Various modification and variations may be made to these exemplary embodiments without departing from the spirit and scope of the invention, which is limited only by the appended claims.

We claim:

1. A computer-implemented method for providing a risk assessment user interface associated with a vessel, the method comprising:
   receiving, at a processor, vessel data from at least one source, the vessel data comprising vessel tracking data received from a vessel tracking device associated with the vessel, the vessel tracking data comprising a plurality of Automatic Identification System (AIS) messages, the vessel tracking device comprising an AIS transceiver associated with the vessel, the at least one source comprising at least one vessel tracking system;
   generating, at the processor, at least one vessel profile based on the vessel data, wherein each vessel profile provides indication of expected behavior events for one vessel and abnormal behavior events for one vessel;
   determining, at the processor, at least one abnormal behavior event of the vessel based on the at least one vessel profile, each event in the at least one abnormal behavior event having a time of occurrence;
   determining, at the processor, at least one frequency of occurrence of abnormal behavior events of the vessel based on the time of occurrence of each abnormal behavior event of the vessel;
   using at least one machine-learning model to determine a risk assessment associated with the vessel based on the at least one frequency of occurrence of abnormal behavior events of the vessel, a first machine-learning model in the at least one machine-learning model selected from the group of a Naïve Bayesian model, a linear regression model, a multiple class classifier, and a Neural Network;
   outputting a user interface comprising a map, a vessel icon positioned on the map based on the vessel tracking data, and the risk assessment associated with the vessel, wherein the map, the vessel icon and the risk assessment are updated automatically based on the updated vessel data.

2. The method of claim 1 wherein the at least one source includes at least one selected from the group of a vessel incidents information source, a vessel information source, a vessel tracking data source, a regional boundaries source, and a crime-related activity source.

3. The method of claim 2 further comprising:
   determining, at the processor, enhanced vessel tracking data based on the vessel data; and
   tagging the enhanced vessel tracking data based on vessel identification.

4. The method of claim 3, wherein the determining the enhanced vessel tracking data comprises merging the vessel data with region boundary data.

5. The method of claim 4 wherein the at least one vessel profile comprises statistical information for a first vessel for a first geographical region and wherein the determination of a first abnormal event of the first vessel for the first geographical region is based on the statistical information.

6. The method of claim 5 wherein an alarm is generated based on the determination of the first abnormal event.

7. The method of claim 6, wherein the at least one abnormal behavior event is determined based on the at least one vessel profile and a behavior data of the vessel for at least one route segment in the first geographical region.

8. The method of claim 7, further comprising:
   determining a cluster of anomalies in the at least one anomaly.

9. The method of claim 8, wherein the determining the risk assessment comprises performing outlier detection based on the at least one abnormal behavior event and the at least one frequency of occurrence of abnormal behavior events.

10. The method of claim 1, wherein the Neural Network is a Recurrent Neural Network.

11. The method of claim 10, wherein:
    the at least one machine-learning model comprise two or more models; and
    the determining the risk assessment associated with the vessel comprises:
      determining a candidate risk assessment for each of the two or more models; and
      performing an election of the candidate risk assessments from the two or more models to determine the risk assessment.

12. The method of claim 11, wherein the at least one machine-learning model is determined for a single vessel.

13. The method of claim 12, wherein the at least one vessel profile includes at least one selected from the group of a vessel MMSI profile, a vessel name profile, a vessel destination profile, a vessel visit duration profile, a vessel trip duration profile, a vessel movement profile, a vessel speed profile, a vessel tracking transmission profile, a vessel tracking position accordance profile, a vessel sea route profile, a vessel crew size profile, a vessel incident profile and a vessel rendezvous profile.

14. The method of claim 13, wherein the detected at least one anomaly includes at least one selected from the group of a speed anomaly, a location anomaly, a vessel tracking transmission anomaly, and a rendezvous anomaly.

15. A computer-implemented system for providing a risk assessment user interface associated with a vessel, the system comprising:
    a memory, the memory comprising:
      a model for determining a risk assessment;
      a processor in communication with the memory, the processor configured to:
        receive vessel data from at least one source, the vessel data comprising vessel tracking data received from a vessel tracking device associated with the vessel, the at least one source comprising at least one vessel tracking system, the vessel tracking data comprising a plurality of Automatic Identification System (AIS)

messages, the vessel tracking device comprising an AIS transceiver associated with the vessel;

generate at least one vessel profile based on the vessel data, wherein each vessel profile provides indication of expected behavior events for one vessel and abnormal behavior events for one vessel;

determine at least one abnormal behavior event of the vessel based on the at least one vessel profile, each event in the at least one abnormal behavior event having a time of occurrence;

determine at least one frequency of occurrence of abnormal behavior events of the vessel based on the time of occurrence of each abnormal behavior event of the vessel;

use at least one machine-learning model to determine a risk assessment associated with the vessel based on the at least one frequency of occurrence of abnormal behavior events, a first machine-learning model in the at least one machine-learning model selected from the group of a Naïve Bayesian model, a linear regression model, a multiple class classifier, and a Neural Network;

output a user interface comprising a map, a vessel icon positioned on the map based on the vessel tracking data, and the risk assessment associated with the vessel, wherein the map, the vessel icon and the risk assessment are updated automatically based on the updated vessel data.

16. The system of claim 15 wherein the at least one source includes at least one selected from the group of a vessel incidents information source, a vessel information source, a vessel tracking data source, a regional boundaries source, and a crime-related activity source.

17. The system of claim 16, wherein the processor is further configured to:
determine enhanced vessel tracking data based on the vessel data; and
tag the enhanced vessel tracking data based on vessel identification.

18. The system of claim 17, wherein the determining the enhanced vessel tracking data comprises merging the vessel data with region boundary data.

19. The system of claim 18, wherein the at least one vessel profile comprises statistical information for a first vessel for a first geographical region and the determination of a first abnormal event of the first vessel for the first geographical region is based on the statistical information.

20. The system of claim 19, wherein an alarm is generated based on the determination of the first abnormal event.

21. The system of claim 20, wherein the at least one abnormal behavior event is determined based on the at least one vessel profile and a behavior data of the vessel for at least one route segment in the first geographical region.

22. The system of claim 21, wherein the processor is further configured to:
determine a cluster of anomalies in the at least one anomaly.

23. The system of claim 22, wherein the determining the risk assessment comprises performing outlier detection based on the at least one abnormal behavior event and the at least one frequency of occurrence of abnormal behavior events.

24. The system of claim 15, wherein the Neural Network is a Recurrent Neural Network.

25. The system of claim 24, wherein the at least one machine-learning model comprises at least two models and the processor is further configured to:
perform an election of the candidate risk assessments from the two or more models to determine the risk assessment.

26. The system of claim 25, wherein the at least one machine-learning model is for a single vessel.

27. The system of claim 26, wherein the at least one vessel profile includes at least one selected from the group of a vessel MMSI profile, a vessel name profile, a vessel destination profile, a vessel visit duration profile, a vessel trip duration profile, a vessel movement profile, a vessel speed profile, a vessel tracking transmission profile, a vessel tracking position accordance profile, a vessel sea route profile, a vessel crew size profile, a vessel incident profile and a vessel rendezvous profile.

28. The system of claim 27, wherein the detected at least one anomaly includes at least one selected from the group of a speed anomaly, a location anomaly, a vessel tracking transmission anomaly, and a rendezvous anomaly.

\* \* \* \* \*